US012807016B2

(12) United States Patent
Yu et al.

(10) Patent No.: US 12,807,016 B2
(45) Date of Patent: Nov. 24, 2026

(54) LIQUID-COOLED CABLE AND SYSTEM THEREOF

(71) Applicant: Amphenol PCD (Shenzhen) Co., Ltd., Shenzhen (CN)

(72) Inventors: Jing Yu, Shenzhen (CN); Hongtu Huang, Shenzhen (CN); Bin Mao, Shenzhen (CN); Guoyong Zhou, Shenzhen (CN)

(73) Assignee: Amphenol PCD (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 19/183,188

(22) Filed: Apr. 18, 2025

(65) Prior Publication Data

US 2026/0158946 A1 Jun. 11, 2026

(30) Foreign Application Priority Data

Apr. 19, 2024 (CN) ......................... 202420828954.0
Jun. 17, 2024 (CN) ......................... 202410781800.5
Jun. 17, 2024 (CN) ......................... 202421383505.6

(51) Int. Cl.
*B60L 53/18* (2019.01)
*B60L 53/302* (2019.01)
*H01B 7/42* (2006.01)

(52) U.S. Cl.
CPC ............. *B60L 53/18* (2019.02); *B60L 53/302* (2019.02); *H01B 7/423* (2013.01)

(58) Field of Classification Search
USPC ......................................................... 320/137
See application file for complete search history.

(56) References Cited

U.S. PATENT DOCUMENTS 10,811,170 B2 10/2020 Gontarz et al.
2019/0237218 A1 8/2019 Heyne et al.
(Continued)

FOREIGN PATENT DOCUMENTS

CN 207425394 U 5/2018
CN 109075478 A 12/2018
(Continued)

OTHER PUBLICATIONS

International Search Report and Written Opinion mailed Jun. 11, 2025 in connection with International Application No. PCT/CN2025/089874.
(Continued)

*Primary Examiner* — Bryce M Aisaka
(74) *Attorney, Agent, or Firm* — Wolf, Greenfield & Sacks, P.C.

(57) ABSTRACT

Liquid-cooled cable and system thereof. A cable includes first pipes, second pipes fluidly connected to the first pipes, and power conducting members disposed in the first pipes. In some embodiments, each first pipe with a power conducting member disposed therein comprises an offset segment. The offset segment has portions spaced from the power conducting member disposed therein by varying distances. In some embodiments, each first pipe with a power conducting member disposed therein includes multiple offset segments, and straight segments connecting adjacent offset segments. In some embodiments, the cable may include straight segments at opposite ends for connecting to a charging gun and a cooling unit, respectively. In some embodiments, the first pipes are outlet pipes, and the second pipes are inlet pipes.
Techniques described herein enables flexible cables that can provide enhanced heat dissipation and therefore improved charging efficiency.

20 Claims, 27 Drawing Sheets

(56) References Cited

U.S. PATENT DOCUMENTS

| | | | | |
|---|---|---|---|---|
| 2022/0219555 | A1* | 7/2022 | Hsu | H01R 13/005 |
| 2023/0035457 | A1 | 2/2023 | Kawalec et al. | |

FOREIGN PATENT DOCUMENTS

| | | | |
|---|---|---|---|
| CN | 111129856 | A | 5/2020 |
| CN | 114464363 | A | 5/2022 |
| CN | 115691891 | A | 2/2023 |
| CN | 115938671 | A | 4/2023 |
| CN | 117175242 | A | 12/2023 |

OTHER PUBLICATIONS

[No Author Listed], Connection set of conductive charging for electric vehicles—Part 4: High power DC charging coupler. National Standard of the People's Republic of China. GB/T 20234.4-2022. Drafted on Jan. 20, 2022. 54 pages.

Extended European Search Report dated Sep. 16, 2025 in connection with European Application No. 25171725.2.

[No Author Listed], Charging cables for electric vehicles of rated voltages up to and including 0,6/1 kV—Part 4-2: Cables for DC charging according to mode 4 of IEC 61851-1—Cables intended to be used with a theermal managemental system. IEC Technical Specification. IEC TS 62893-4-2. Edition 1.0. Jun. 2021. 28 pages.

* cited by examiner

LIQUID-COOLED CABLE AND SYSTEM THEREOF

CROSS-REFERENCE TO RELATED APPLICATIONS

This application claims priority to and the benefit of Chinese Patent Application No. 202410781800.5, filed on Jun. 17, 2024. This application also claims priority to and the benefit of Chinese Patent Application No. 202421383505.6, filed on Jun. 17, 2024. This application also claims priority to and the benefit of Chinese Patent Application No. 202420828954.0, filed on Apr. 19, 2024. The contents of these applications are incorporated herein by reference in their entirety.

TECHNICAL FIELD

The present application relates to interconnection systems, such as those including liquid-cooled cables and systems thereof.

BACKGROUND

Cables play a crucial role in the efficiency and safety of the charging process. For example, as electric vehicles (EV) adoption grows, so does the demand for shorter charging times, which requires cables capable of carrying high currents without overheating. Some systems incorporate liquid cooling to increase the current-carrying capacity of the cables. In these systems, an electric pump circulates coolant through cables. During charging, the cables generate heat due to the high current load. The coolant absorbs this heat and carries it to a reservoir, then passes through a radiator where the heat is dissipated before recirculating.

SUMMARY

Aspects of the present disclosure relate to liquid-cooled cables and systems thereof.

Some embodiments relate to a liquid-cooled cable. The liquid-cooling cable may include a plurality of power conducting members, each of the plurality of power conducting members extending between a first end and a second end; and a plurality of pipes, each of the plurality of pipes enclosing a respective power conducting member of the plurality of power conducting members and configured for coolant to flow from the first end to the second end of the respective power conducting member, each of the plurality of pipes comprising an offset segment having portions spaced from the respective power conducting member by varying distances.

Optionally, for each of the plurality of pipes, the offset segment comprises a plurality of convex portions, and a plurality of spaces between adjacent convex portions of the plurality of convex portions; and each of the plurality of convex portions extends in a circumferential direction of the pipe.

Optionally, each of the plurality of convex portions has a V-shaped, U-shaped, or trapezoidal cross-section.

Optionally, the offset segment is spiral-shaped or corrugated.

Optionally, the offset segment comprises a plurality of corrugated portions and/or a plurality of spiral portions.

Optionally, for each of the plurality of pipes, the offset segment has a length ranging from 1% to 100% of a length of the pipe.

Optionally, for each of the plurality of pipes, the offset segment has a bending radius in a range of four times to ten times an outer diameter of the pipe.

Optionally, the plurality of pipes are a plurality of first pipes; and the cable comprises a plurality of second pipes fluidly connected to respective first pipes of the plurality of first pipes.

Optionally, the plurality of power conducting members comprise a positive power conducting member and a negative power conducting member each disposed in a respective first pipe of the plurality of first pipes; and none of the plurality of power conducting members are disposed in any of the plurality of second pipes.

Optionally, the plurality of first pipes are a plurality of outlet pipes; and the plurality of second pipes are a plurality of inlet pipes.

Optionally, each of the plurality of power conducting members has a nominal cross-sectional area in a range of 16 $mm^2$ to 240 $mm^2$; and the cable comprises a grounding member having a nominal cross-sectional area in a range of 2 $mm^2$ to 100 $mm^2$, and a plurality of signal conducting members each having a nominal cross-sectional area in a range of 0.2 $mm^2$ to 2.5 $mm^2$.

Optionally, each of the plurality of power conducting members extends longitudinally over a length in a range of 1 meter to 15 meters; and the plurality of power conducting members have an operating temperature in a range of 50° C. to 85° C. under an application of a direct current in a range of 500 A to 800 A.

Some embodiments relate to a charging system. The charging system may include a charging gun comprising a plurality of connecting members; and a liquid-cooled cable. The liquid-cooled cable may include a plurality of inlet pipes, each of the plurality of inlet pipes connected to a respective connecting member of the plurality of connecting members, a plurality of outlet pipes, each of the plurality of outlet pipes connected to a respective inlet pipe of the plurality of inlet pipes through the respective connecting member such that there is a coolant flow path into the respective inlet pipe through the respective connecting member and into the outlet pipe, and a plurality of power conducting members, each of the plurality of power conducting members disposed in a respective outlet pipe of the plurality of outlet pipes.

Optionally, each of the plurality of outlet pipes comprises an offset segment, the offset segment comprising a plurality of protruding portions and a plurality of spaces disposed between adjacent protruding portions of the plurality of protruding portions, such that the plurality of protruding portions are configured to move closer to adjacent protruding portions when the outlet pipe is in a flexed state.

Optionally, the cable comprises a first end connected to the charging gun, and a second end configured for connection with a cooling unit.

Optionally, each of the plurality of outlet pipes comprises a first straight segment at the first end, a second straight segment at the second end, and the offset segment between the first straight segment and the second straight segment; and a distance between a center point of the offset segment in a longitudinal direction and the charging gun is in a range of 1 meter to 15 meters.

Optionally, each of the plurality of power conducting members has a nominal cross-sectional area in a range of 16 $mm^2$ to 240 $mm^2$; and the cable comprises a grounding member having a nominal cross-sectional area in a range of 2 $mm^2$ to 100 $mm^2$, and a plurality of signal conducting members each having a nominal cross-sectional area in a range of 0.2 $mm^2$ to 2.5 $mm^2$.

Optionally, each of the plurality of power conducting members extends longitudinally over a length in a range of 1 meter to 15 meters; and the plurality of power conducting members have an operating temperature in a range of 50° C. to 85° C. under an application of a rated direct current in a range of 500 A to 800 A.

Some embodiments relate to a method of cooling a cable. The cable may extend between a first end and a second end, and comprising a plurality of power conducting members, a plurality of first pipes each enclosing a respective power conducting member of the plurality of power conducting members, and a plurality of second pipes. The method may include flowing coolant into the plurality of second pipes from the second end of the cable to the first end of the cable; directing the coolant to enter the plurality of first pipes from respective second pipes of the plurality of second pipes from the first end of the cable and to surround the plurality of power conducting members; and flowing the coolant out of the plurality of first pipes from the second end of the cable.

Optionally, the first end of the cable is connected to a plurality of connecting members; and directing the coolant to enter the plurality of first pipes comprises flowing the coolant through the plurality of connecting members.

Optionally, the first end of the cable is configured to be connected to a load; and the second end of the cable is configured to be connected to a power source.

Some embodiments relate to a charging system. The charging system may include a liquid-cooled cable comprising a plurality of power conducting members, each of the plurality of power conducting members extending between a first end and a second end, and a plurality of pipes, each of the plurality of pipes enclosing a respective power conducting member of the plurality of power conducting members and configured for coolant to flow from the first end to the second end of the respective power conducting member; a plurality of connecting members, each of the plurality of connecting members comprising a first opening, a second opening, and a third opening, and connected to a respective pipe of the plurality of pipes at the second opening; and a plurality of terminals attached to respective ends of the first and second ends of respective power conducting members of the plurality of power conducting members, each of the plurality of terminals comprising a first portion disposed in a respective connecting member of the plurality of connecting members and a second portion extending out of the first opening of the respective connecting member.

Optionally, the plurality of pipes are a plurality of first pipes; and the charging system comprises a plurality of second pipes connected to the second openings of respective connecting members of the plurality of connecting members.

Optionally, the plurality of terminals are configured to be connected to a load; the plurality of first pipes are outlet pipes to the plurality of connecting members; and the plurality of second pipes are inlet pipes to the plurality of connecting members.

Optionally, the plurality of terminals are configured to be connected to a power source; the plurality of first pipes are inlet pipes to the plurality of connecting members; and the plurality of second pipes are outlet pipes to the plurality of connecting members.

Optionally, for each of the plurality of terminals, the second portion comprises an opening.

Optionally, each of the plurality of connecting members comprises plastic and/or metal.

Optionally, each of the plurality of connecting members comprises a rotatable portion having the third opening.

Some embodiments relate to a cable. The cable may comprise a plurality of power conducting members each extending between a first end of the cable and a second end thereof opposite to the first end; and a plurality of pipes each enclosing a respective power conducting member of the power conducting members. A coolant passage for circulation of a coolant may be disposed between an outer peripheral surface of the power conducting member and an inner peripheral surface of the pipe. Each of the plurality of pipes may comprise an offset segment. A distance in a radial direction of the pipe between an inner peripheral surface of the offset segment and a central axis of the corresponding power conducting member may vary along a longitudinal direction of the pipe, as observed in a longitudinal cross-sectional view of the pipe.

Optionally, the offset segment may comprise at least one of a spiral portion or a corrugated portion.

Optionally, the corrugated portion may comprise a plurality of convex portions arranged to be spaced apart from each other, and each of the convex portions extends in a circumferential direction of the pipe.

Optionally, each of the convex portions has a V-shaped, U-shaped, or trapezoidal cross-section, in a longitudinal cross-sectional view of the pipe.

Optionally, the spiral portion may comprise a convex portion extending in a spiral configuration around a central axis of the pipe.

Optionally, the offset segment may comprise a plurality of corrugated portions and/or a plurality of spiral portions.

Optionally, the offset segment may have a length ranging from 1% to 100% of a length of the pipe. Optionally, the offset segment may have a length ranging from 20% to 80% of the length of the pipe.

Optionally, the offset segment has a bending radius that is in a range of four times to ten times an outer diameter of the pipe, and the cable has a bending radius that is in a range of four times to ten times an outer diameter of the cable.

Optionally, the plurality of pipes are configured as outlet pipes, and the cable may further comprise a plurality of inlet pipes extending substantially parallel to and in fluid communication with the outlet pipes, and the coolant flows into the inlet pipes and exits via the outlet pipes.

Optionally, the plurality of power conducting members comprise a first power conducting member and a second power conducting member. The inlet pipe may comprise a first inlet pipe and a second inlet pipe; the outlet pipe may comprise a first outlet pipe that extends substantially parallel to and is in fluid communication with the first inlet pipe, and a second outlet pipe that extends substantially parallel to and is in fluid communication with the second inlet pipe. The first power conducting member is disposed in the first outlet pipe and the second power conducting member is disposed in the second outlet pipe.

Optionally, the plurality of power conducting members may comprise two first power conducting members and two second power conducting members. The inlet pipe may comprise a first inlet pipe and a second inlet pipe. The outlet pipe may comprise two first outlet pipes extending substantially parallel to and in fluid communication with the first inlet pipe; and two second outlet pipes extending substantially parallel to and in fluid communication with the second inlet pipe. The two first power conducting members are disposed in the two first outlet pipes respectively, and the two second power conducting members are disposed in the two second outlet pipes respectively.

Optionally, the power conducting member of the cable operates at a temperature in a range of 50° C. to 85° C. under the application of a DC current of 500 A to 800 A.

Optionally, a nominal cross-sectional area of a core of each of the plurality of power conducting members is in a range of 16 $mm^2$ to 240 $mm^2$.

Optionally, the cable may further comprise a grounding member with a core that has a nominal cross-sectional area ranging from 2 $mm^2$ to 100 $mm^2$.

Optionally, the cable may further comprise a plurality of signal conducting members each having a core with a nominal cross-sectional area in a range of 0.2 $mm^2$ to 2.5 $mm^2$.

Optionally, the pipe is made of fluoroplastic.

Some embodiments relate to a charging system for electric vehicles. The charging system may comprise: a charging gun; and a cable connecting the charging gun to a cooling unit, a first end of the cable is connected to the charging gun, and a second end of the cable opposite to the first end is connected to the cooling unit. The cable may comprise a plurality of pipes configured for flow of a coolant, each of the plurality of pipes may comprise an offset segment. The offset segment comprises, in a longitudinal cross-section view of the pipes, a plurality of protruding portions protruding in a radial direction of the pipes. A space is disposed between the adjacent protruding portions. The plurality of protruding portions are configured in such a way that in case that the cable is bent, the space varies under an action of a bending force to accommodate a relative movement between the adjacent protruding portions.

Optionally, the plurality of protruding portions may comprise a plurality of convex portions spaced apart from each other in a longitudinal direction of the pipe, and the convex portions each extend along a circumferential direction of the pipe.

Optionally, each of the convex portions has a V-shaped, U-shaped, or trapezoidal cross-section, in a longitudinal cross-sectional view of the pipe.

Optionally, the plurality of protruding portions may further comprise successive convex portions extending in a spiral configuration around a central axis of the pipe.

Optionally, the pipe is configured as an outlet pipe. The cable may further comprise: a plurality of outlet pipes; a plurality of inlet pipes extending substantially parallel to and in fluid communication with the outlet pipes, and the coolant flows into the inlet pipes and exits via the outlet pipes.

Optionally, the charging gun may comprise a first connecting member configured to fluidly connect the inlet pipe to the outlet pipe; a coolant from the cooling unit flows into the inlet pipe and enters the outlet pipe via the first connecting member, and then flows back to the cooling unit from the outlet pipe.

Optionally, the charging system may further comprise a second connecting member provided at a second end of the cable. The second connecting member is configured in such a way that the outlet pipe and the inlet pipe are respectively in fluid communication with the cooling unit.

Optionally, the outlet pipe may comprise a first straight segment adjacent to the first end, a second straight segment adjacent to the second end, and an offset segment provided between the first straight segment and the second straight segment. A distance between a center point of the offset segment in a longitudinal direction and the charging gun is in a range of 1 meter to 15 meters.

These techniques may be used alone or in any suitable combination. The foregoing summary is provided by way of illustration and is not intended to be limiting.

BRIEF DESCRIPTION OF THE DRAWINGS

The accompanying drawings may not be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1A:
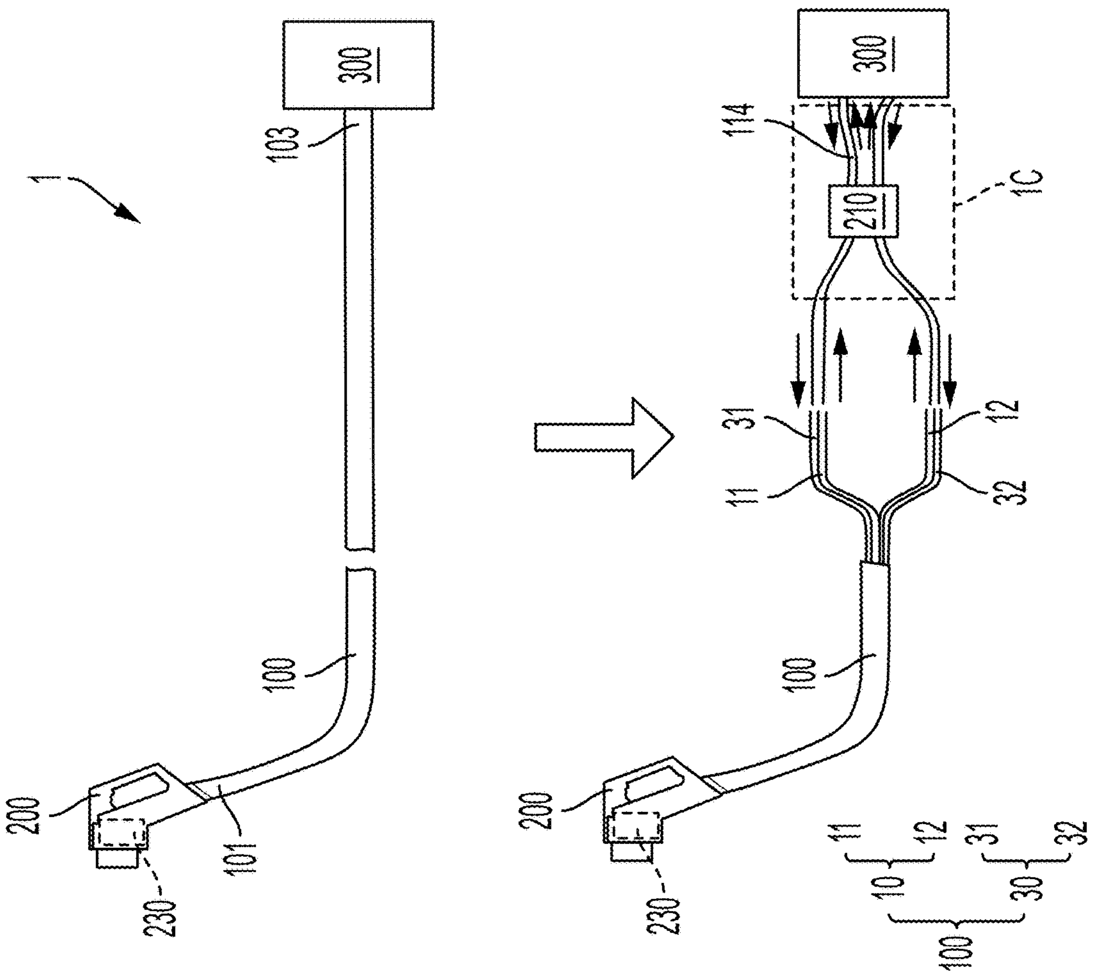
FIG. 1A is a schematic view of a charging system, according to some embodiments.
Figure 1B:
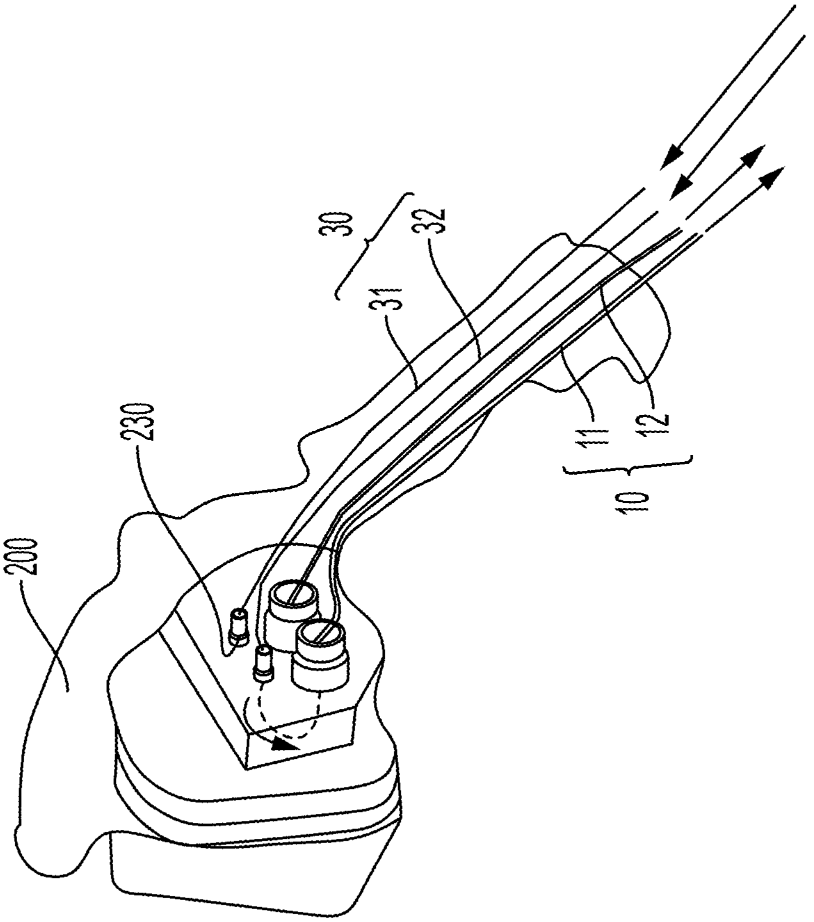
FIG. 1B is an enlarged view of a charging gun of the charging system of FIG. 1A, with portions cut away to reveal fluid manifolds.

The inventors have recognized and appreciated design techniques for flexible liquid-cooled cable and system thereof to provide enhanced heat dissipation and therefore improved charging efficiency. Conventional liquid-cooled cables are often rigid and may exhibit inadequate heat dissipation, limiting their charging efficiencies, for example, in high-load and/or fast-charging applications. Cables described herein may have both enhanced flexibility and improved heat dissipation, enabling them to accommodate various complex installation layouts and bending requirements while supporting high-load and/or fast charging applications.

According to aspects of the present disclosure, a cable may extend from a first end to a second end. The cable may include first pipes, second pipes fluidly connected to the first pipes, and power conducting members disposed in the first pipes. In some embodiments, each first pipe with a power conducting member disposed therein may include an offset segment. The offset segment may include portions spaced from the power conducting member disposed therein by varying distances. The inventors have recognized and appreciated that such a configuration may increase the volume of coolant that directly contacts the power conducting member within a given time period, compared with conventional cables, thereby improving heat dissipation efficiency. In some embodiments, each first pipe with a power conducting member disposed therein may include multiple offset segments, and straight segments connecting adjacent offset segments. In some embodiments, the cable may include straight segments at opposite ends for connecting to a charging gun and a cooling unit, respectively.

In some embodiments, the first pipes may be outlet pipes, and the second pipes may be inlet pipes. The outlet pipes may be connected to respective inlet pipes such that cold coolant, which may be supplied by a cooling unit, may enter the cable through the inlet pipes at the second end of the cable. The coolant may then flow through the inlet pipes toward the first end of the cable, during which the coolant may absorb heat from components inside the cable, such as the outlet pipes with power conducting members disposed therein, and/or signal conducting members. Subsequently, the coolant may enter the outlet pipes at the first end of the cable and flow through the outlet pipes back toward the second end of the cable for exiting, during which the coolant may absorb heat generated by the respective power conducting members. The inventors have recognized and appreciated that such a configuration may enable the coolant to absorb more heat along its flow path and maintain the operating temperature at a desired level, as the coolant may remain at a temperature lower than that of components it encounters along the flow path.

In some embodiments, ends of the cable may be connected to connecting members for connecting to a load and a power source, respectively. Each connecting member may include a first opening, a second opening, and a third opening. At the first end, the cable may be connected to first connecting members. The first pipes of the cable may be connected to the second openings of the first connecting members. The second pipes of the cable may be connected to the third openings of the first connecting members. First terminals may be attached to the power conducting members at the first end of the cable. Each first terminal may include a first portion disposed in a respective first connecting member and a second portion extending out of the first opening of the respective first connecting member. At the second end, the cable may be connected to second connecting members. The first pipes of the cable may be connected to the second openings of the second connecting members. Third pipes may be connected to the third openings of the second connecting members. Second terminals may be attached to the power conducting members at the second end of the cable. Each second terminal may include a first portion disposed in a respective second connecting member and a second portion extending out of the first opening of the respective second connecting member.

In some embodiments, a method of cooling the cable may include flowing coolant into the plurality of second pipes from the second end of the cable to the first end of the cable; directing the coolant to enter the plurality of first pipes from respective second pipes of the plurality of second pipes from the first end of the cable and surround the plurality of power conducting members; and flowing the coolant out of the plurality of first pipes from the second end of the cable. In some embodiments, the first end of the cable may be connected to a charging gun via a plurality of first connecting members; and directing the coolant to enter the plurality of first pipes may include flowing the coolant through the plurality of first connecting members of the charging gun. In some embodiments, the second end of the cable may be connected to a cooling unit via a plurality of second connecting members; and the method may include flowing the coolant into the plurality of second connecting members through the first pipes and out of the plurality of second connecting members through third pipes.

Next, exemplary embodiments of liquid-cooled cables and charging system thereof according to the present disclosure will be described in connection with the accompanying drawings.

Figure 1C:
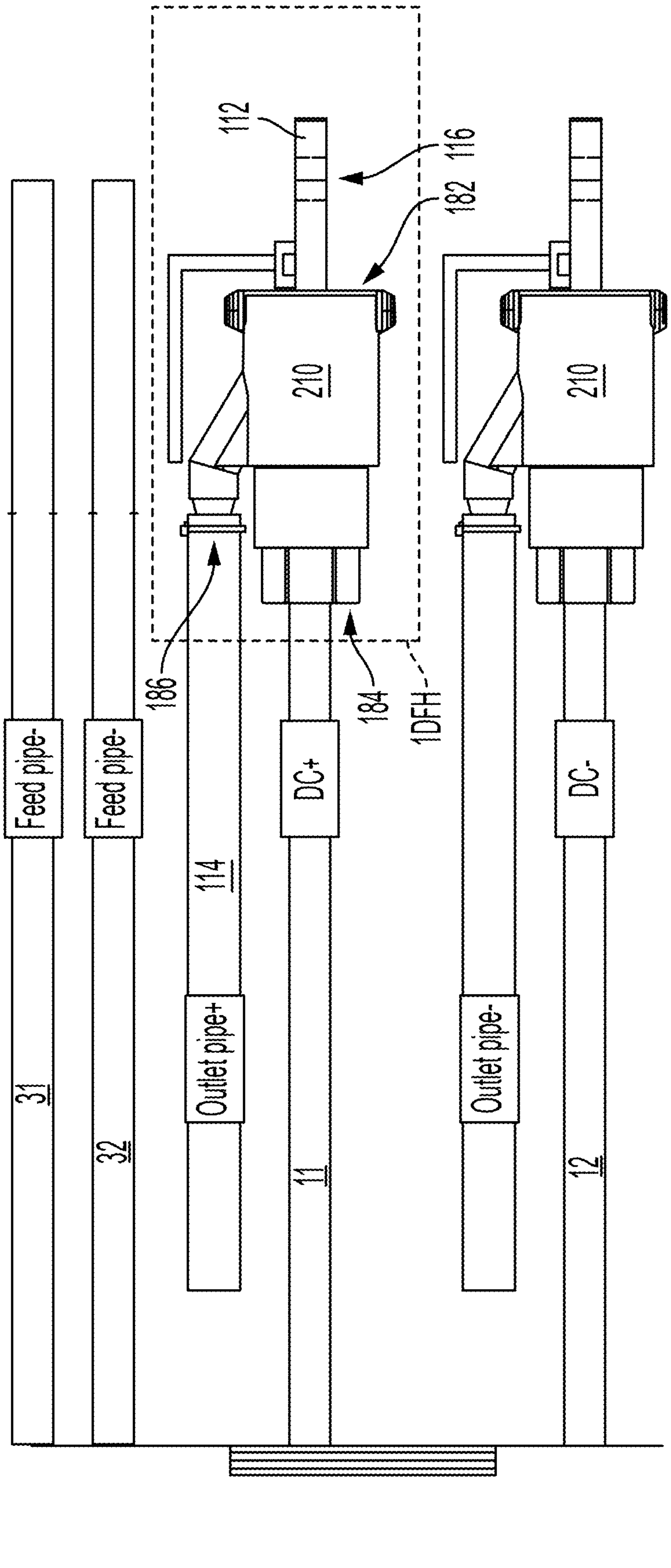
FIG. 1C is an enlarged schematic view of a portion of the charging system of FIG. 1A within a dashed box marked "1C" in FIG. 1A.
Figure 1D:
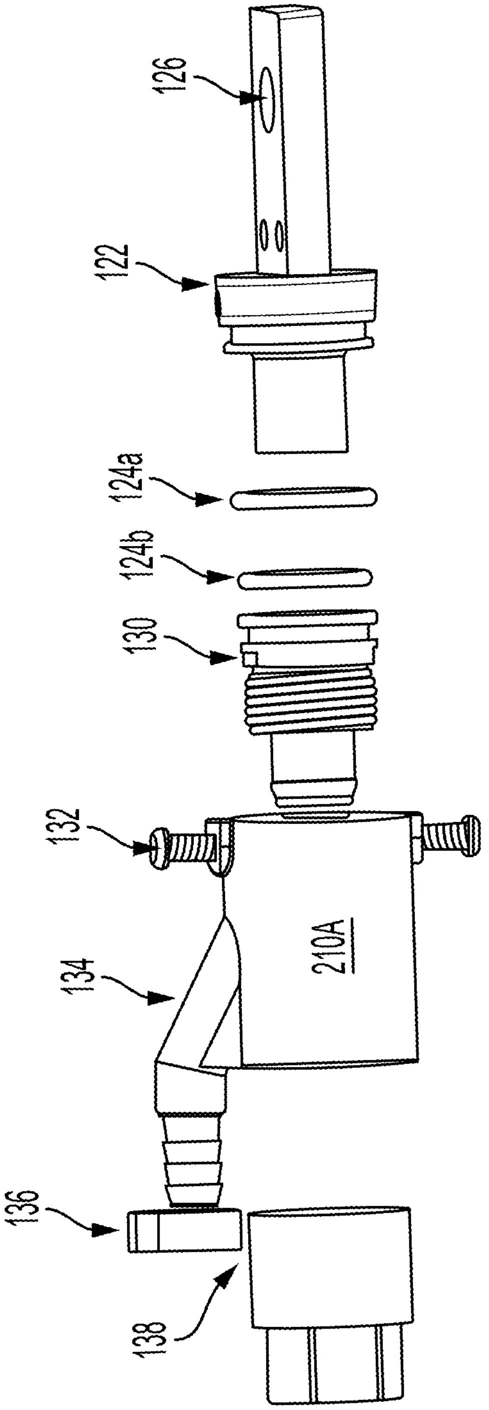
FIG. 1D is a perspective view of a portion of the charging system of FIG. 1C within a dashed box marked "1DFH," according to some embodiments.
Figure 1E:
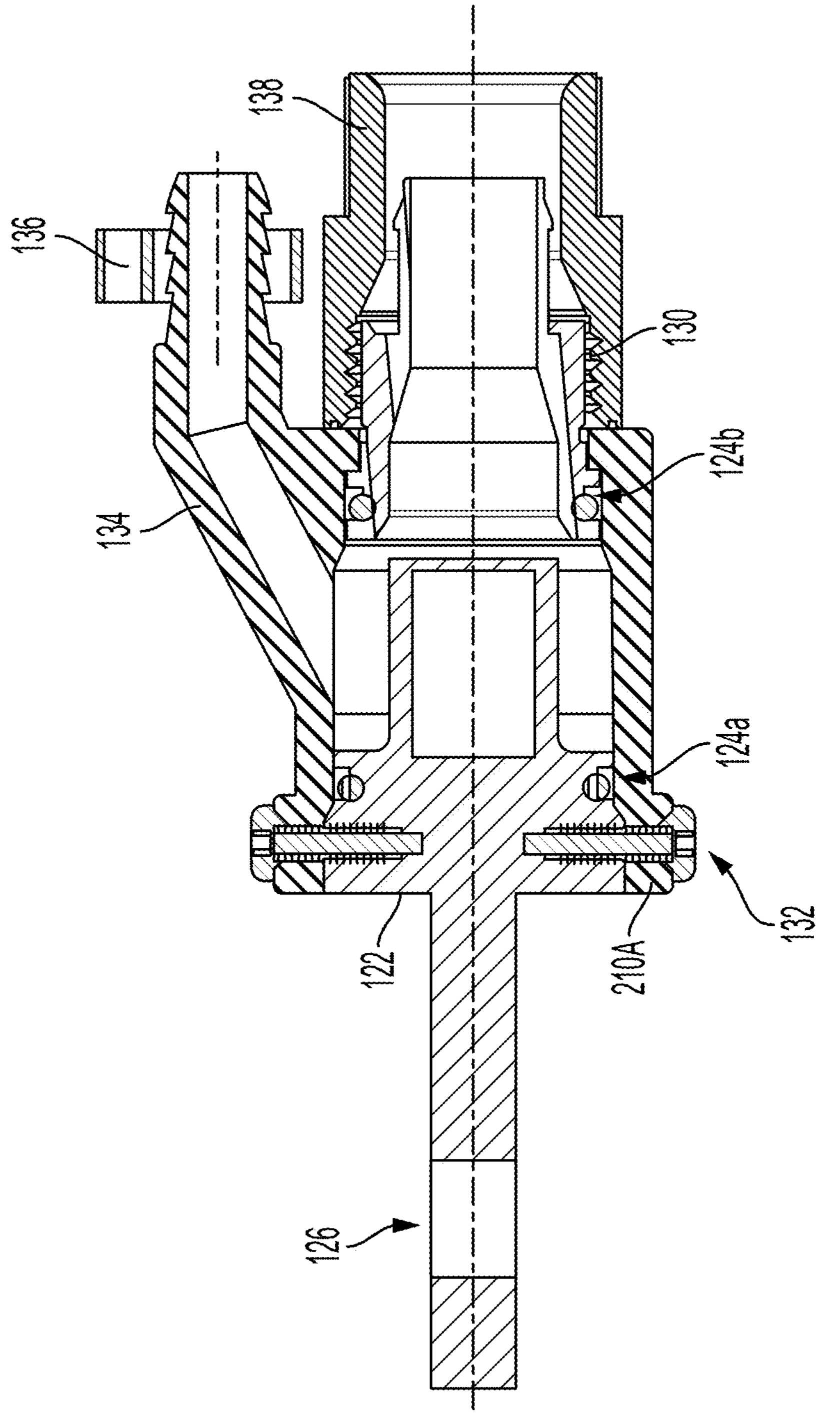
FIG. 1E is a cross-sectional view of the charging system of FIG. 1D, looking from a plane perpendicular to a direction the coolant flows.
Figure 1F:
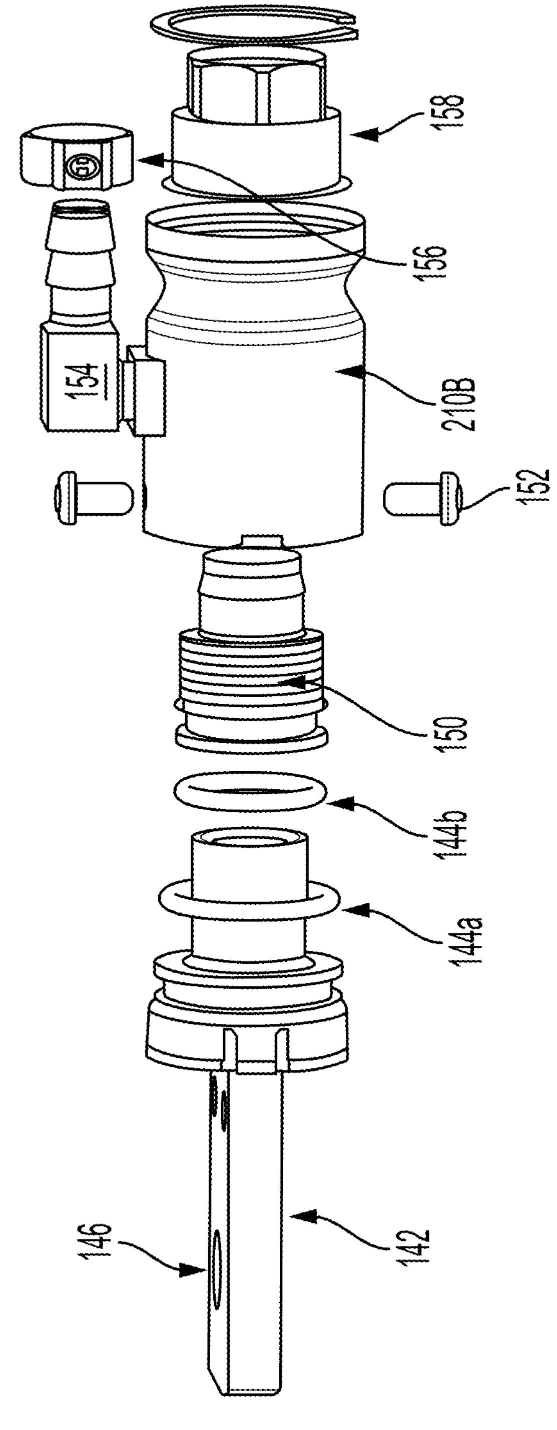
FIG. 1F is a perspective view of a portion of the charging system of FIG. 1C within a dashed box marked "1DFH," according to some embodiments.
Figure 1G:
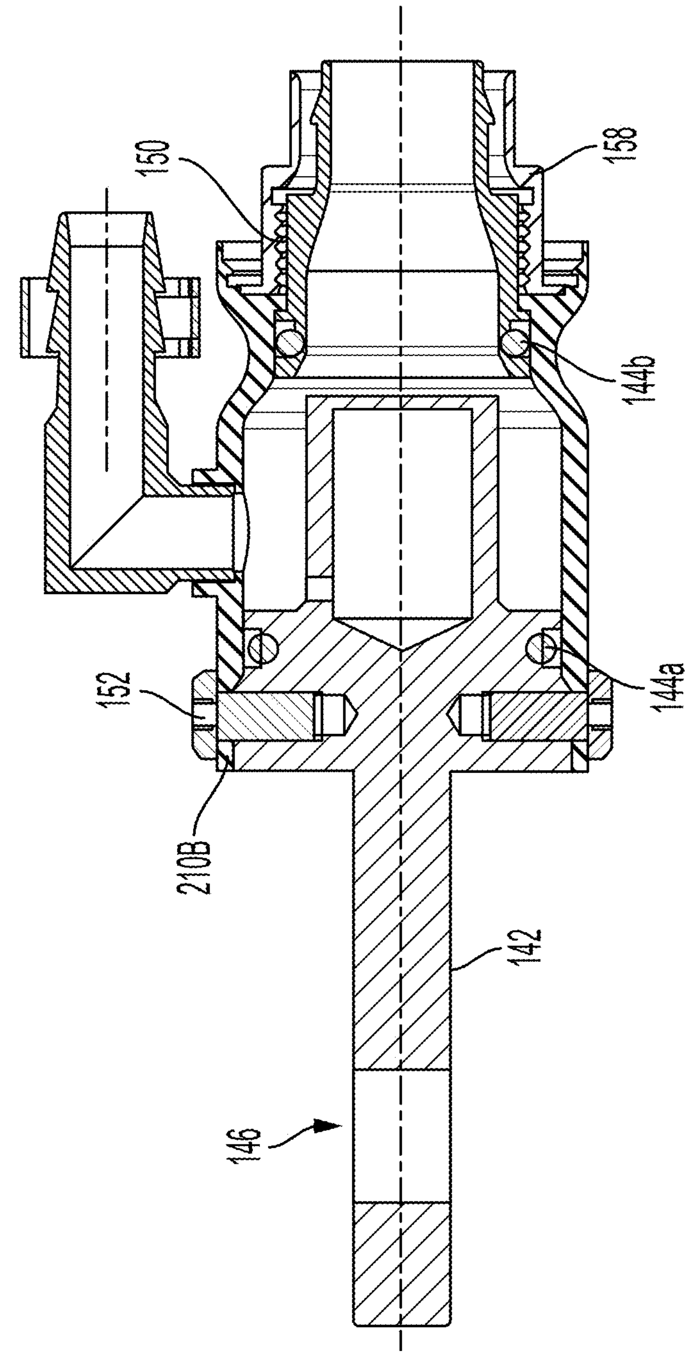
FIG. 1G is a cross-sectional view of the charging system of FIG. 1F, looking from a plane perpendicular to a direction the coolant flows.
Figure 1H:
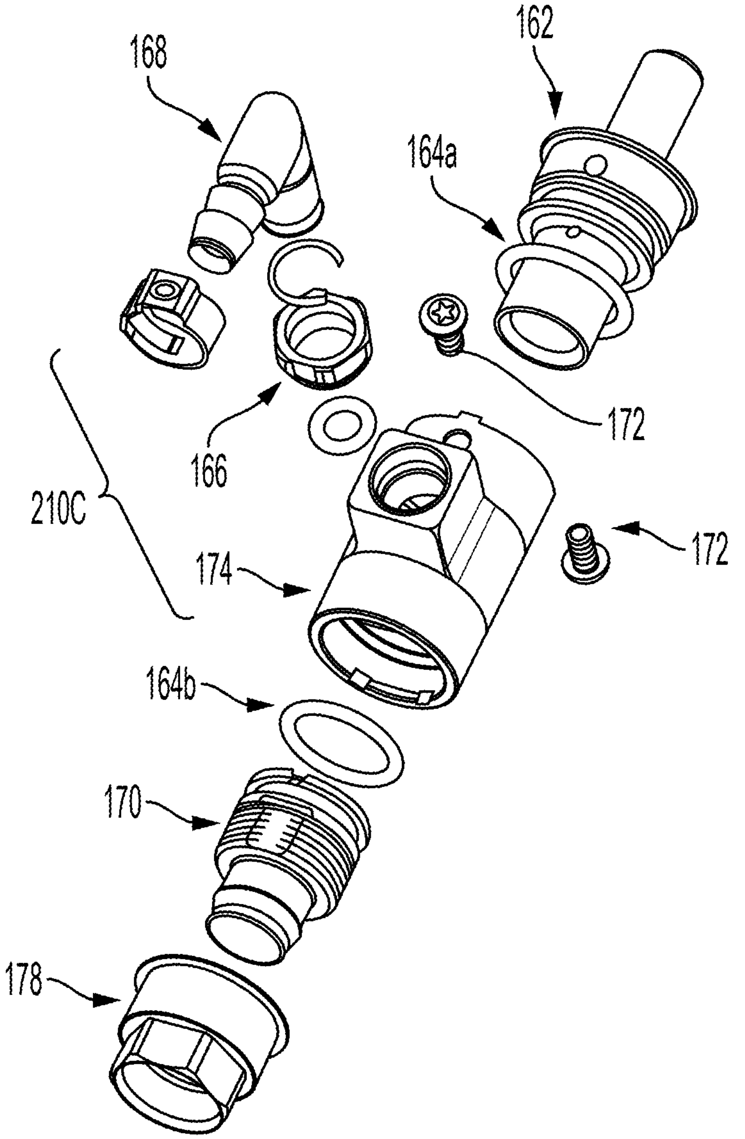
FIG. 1H is a perspective view of a portion of the charging system of FIG. 1C within a dashed box marked "1DFH," according to some embodiments.
Figure 1I:
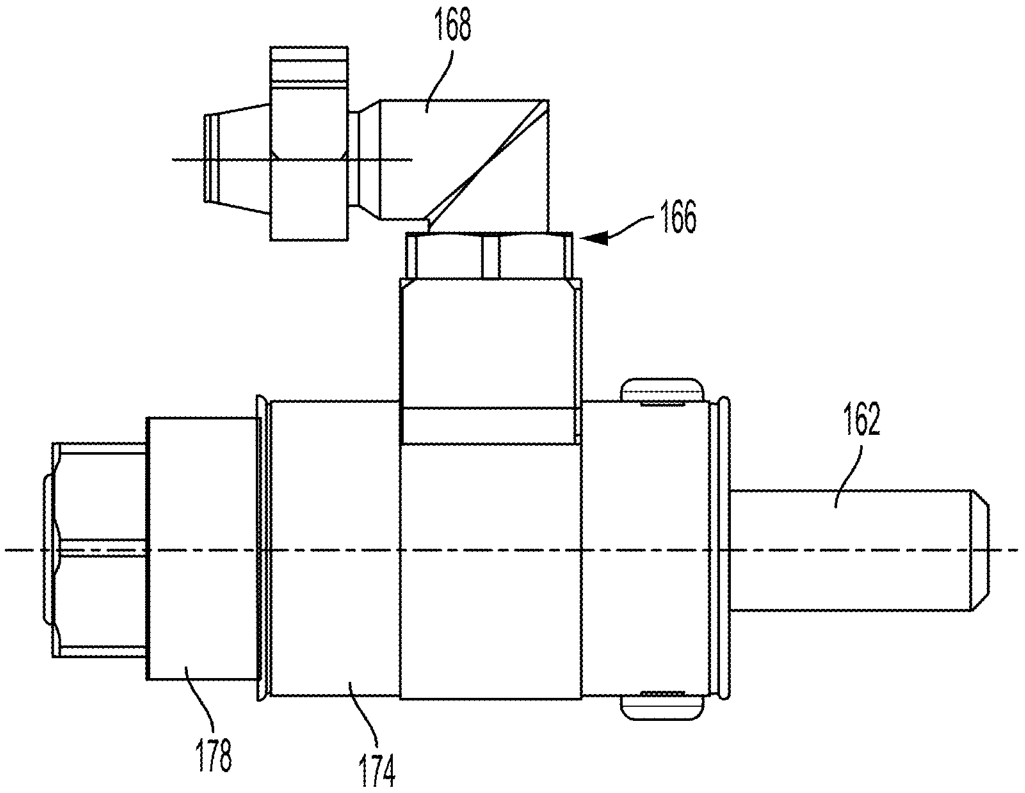
FIG. 1I is a side view of the charging system of FIG. 1H.
Figure 2:
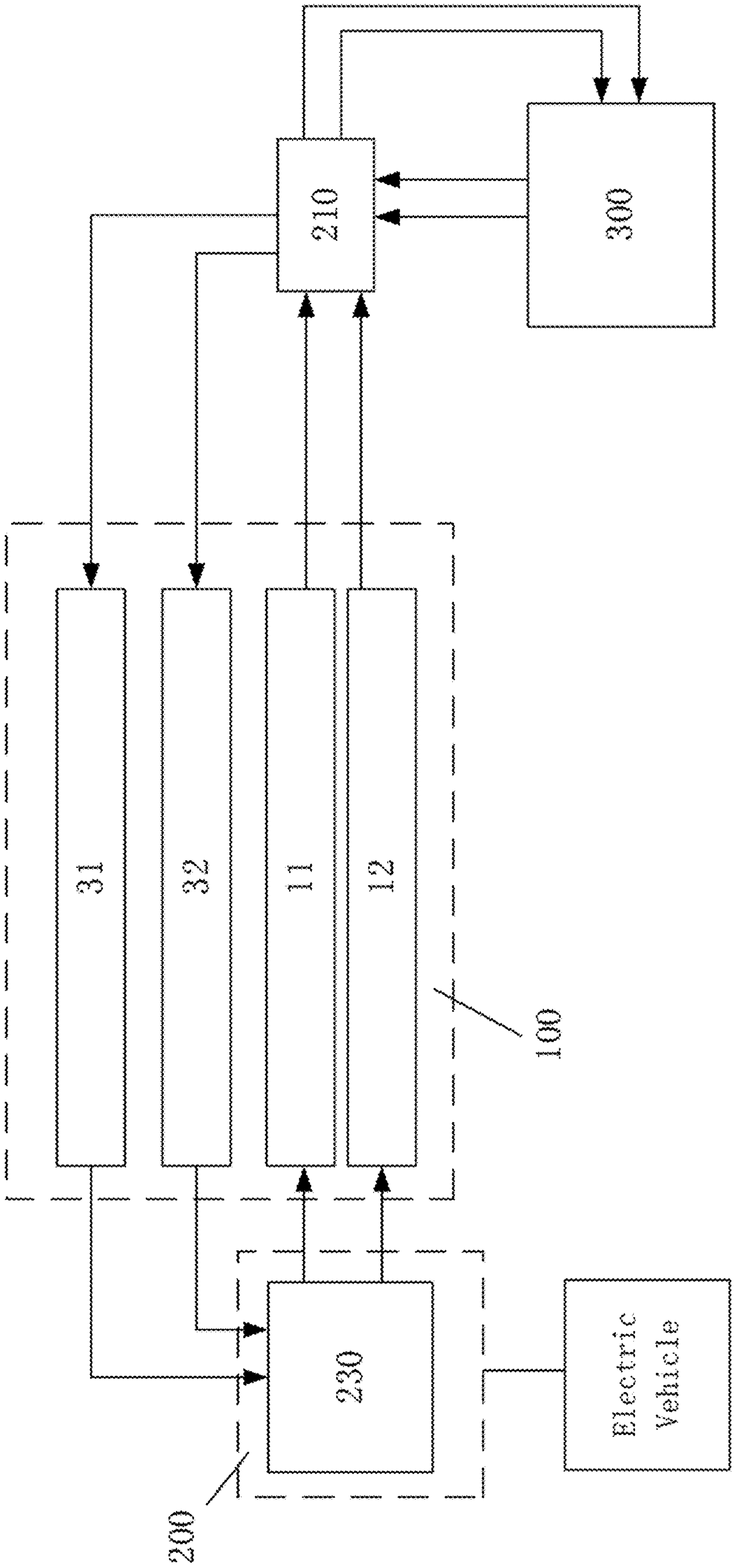
FIG. 2 is a block diagram of the charging system of FIG. 1A.

FIGS. 1A-2 depict an exemplary charging system 1. In some embodiments, the charging system 1 may be implemented as a charging pile. In the illustrated example, the charging system 1 may include a charging gun 200, a cooling unit 300, and a cable 100 connecting the charging gun 200 to the cooling unit 300, which may be integrated with or separate from a power source. The cable 100 may include a first end 101 connected to the charging gun 200, and a second end 103 opposite to the first end 101 and connected to the cooling unit 300 and/or power source.

In some embodiments, the cable 100 may be a power cable. The cable 100 may include power conducting members configured to carry current to and from a supply source. The power conducting members may be electrically connected to the charging gun 200, which may be connected to a load. The cable 100 may comprise a first power conducting member and a second power conducting member. One of the first and second power conducting members may be configured to carry current from a power source to a load (which may be referred to as "positive power conducting member"); and the other one of the first and second power conducting member may be configured to carry current back from the load to the power source (which may be referred to as "negative power conducting member"). Each first and second power conducting members may be connected to first terminals at the first end 101 of the cable 100 for connecting to a load, and second terminals at the second end 103 of the cable 100 for connecting to a power source.

In some embodiments, the cable 100 may be a liquid-cooled power cable. The cable 100 may comprise pipes configured to carry liquid coolant to and from the cooling unit 300. In the illustrated example, the cable 100 may comprise inlet pipes 30 and outlet pipes 10. The inlet pipes 30 may comprise a first inlet pipe 31 and a second inlet pipe 32. The outlet pipes 10 may comprise a first outlet pipe 11 in fluid communication with the first inlet pipe 31 and a second outlet pipe 12 in fluid communication with the second inlet pipe 32. The outlet pipes 10 may extend substantially parallel to the first inlet pipe 31. The second outlet pipe 12 may extend substantially parallel to the second inlet pipe 32.

In some embodiments, the first power conducting member may be disposed in the first outlet pipe 11. The second power conducting member may be disposed in the second outlet pipe 12. Coolant may flow from the cooling unit 300 into the first inlet pipe 31 and exit via the first outlet pipe 11. Coolant may flow from the second inlet pipe 32 and exit via the second outlet pipe 12. The outlet pipe 10 may include an offset segment as described herein. Examples of the coolant include oil, glycol, fluorinated liquid, water, and other appropriate coolant, as the present disclosure is not intended to be limited in this regard.

Referring to FIGS. 1A-2, the charging system 1 may include a first connecting member 230 configured to enable the inlet pipes 30 to be in fluid communication with the outlet pipes 10, and a second connecting member 210 at a second end 103 of the cable configured to enable the outlet pipe 10 be in fluid communication with the cooling unit 300. A coolant from the cooling unit 300 may flow into the inlet pipe 30 and enter the outlet pipes 10 via the first connecting member 230, and then flow back to the cooling unit 300 through the outlet pipes 10. The arrows in FIGS. 1A-2 may indicate flowing directions of the coolant.

FIG. 1C is an enlarged schematic view of a portion of the charging system 1 within a dashed box marked "1C" in FIG. 1A. As illustrated, each of first and second power conducting members may be connected to a second terminal 112 inside a second connecting member 210. Each second connecting member 210 may include a first opening 182, a second opening 184, and a third opening 186. The second terminal 112 may include a first portion disposed in a respective second connecting member 210 and a second portion extending out of the first opening 182 of the respective second connecting member 210. The second portion of the second terminal 112 may include an opening 116, through which the second terminal 112 may be securely attached to the power source. The outlet pipes 10 may be connected to the second openings 184 of the respective second connecting members 210. Outlet pipes 114 may be connected to the third openings 186 of the respective second connecting members 210. The outlet pipes 10 may be connected to outlet pipes 114, which may be connected to the cooling unit 300, such that coolant can flow out of the outlet pipes 10 into the second connecting members and back to the cooling unit 300 through outlet pipes 114.

Although the second end 103 of the cable 100 is illustrated, it should be appreciated that the first end 101 of the cable 100 may share features the second end 103 of the cable 100. For example, each of the first connecting members 230 may include a first opening, a second opening, and a third opening. The first terminal may include a first portion disposed in a respective first connecting member and a second portion extending out of the first opening of the respective first connecting member. The outlet pipes 10 may be connected to the second openings of the respective first connecting members 230. The inlet pipes 30 may be connected to the third openings of the respective first connecting members 230.

FIG. 1D is a perspective view of a portion of the charging system of FIG. 1C within a dashed box marked "1DFH," according to some embodiments. FIG. 1E is a cross-sectional view of the charging system of FIG. 1D, looking from a plane perpendicular to a direction the coolant flows. As illustrated, a terminal 122 can be secured to a second connecting member 210A by, for example, screws 132. The second portion of the second terminal 122 may include an opening 126, through which the second terminal 122 may be securely attached to the power source. An inner sleeve 130 may be disposed in the second connecting member 210A and extend out of the second opening of the second connecting member 210A. A respective power conducting member may extend through the inner sleeve 130 and be connected to the terminal 122. Seal 124*a* may be disposed to seal gaps between the second terminal 122 and the second connecting member 210A. Seal 124*b* may be disposed to seal gaps between the inner sleeve 130 and the second connecting member 210A. A nut 138 may be disposed around the portion of the inner sleeve 130 that extends out of the second connecting member 210A. The second connecting member 210A may include a branch 134, to which a pipe (e.g., pipe 114) may be attached and secured by a ring 136. A pipe (e.g., pipe 10) may be attached to the nut 138 and so as to be in fluid communication with the pipe attached to branch 134. In some embodiments, the second connecting member 210A and the nut 138 may be made from plastic.

FIG. 1F is a perspective view of a portion of the charging system of FIG. 1C within a dashed box marked "1DFH," according to some embodiments. FIG. 1G is a cross-sectional view of the charging system of FIG. 1F, looking from a plane perpendicular to a direction the coolant flows. As illustrated, a terminal 142 can be secured to a second connecting member 210B by, for example, screws 152. The second portion of the second terminal 142 may include an opening 146, through which the second terminal 142 may be securely attached to the power source. An inner sleeve 150 may be disposed in the second connecting member 210B and extend out of the second opening of the second connecting member 210B. A respective power conducting member may extend through the inner sleeve 150 and be connected to the terminal 142. Seal 144*a* may be disposed to seal gaps between the second terminal 142 and the second connecting member 210B. Seal 144*b* may be disposed to seal gaps between the inner sleeve 150 and the second connecting member 210B. A nut 158 may be disposed around the portion of the inner sleeve 150 that extends out of the second connecting member 210B. The second connecting member 210B may include a branch 154, to which a pipe (e.g., pipe 114) may be attached and secured by a ring 156. A pipe (e.g., pipe 10) may be attached to the nut 158 and so as to be in fluid communication with the pipe attached to branch 154. In some embodiments, the second connecting member 210B may be made from metal.

FIG. 1H is a perspective view of a portion of the charging system of FIG. 1C within a dashed box marked "1DFH," according to some embodiments. FIG. 1I is a side view of the charging system of FIG. 1H. As illustrated, a terminal 162 can be secured to a second connecting member 210C by, for example, screws 172. An inner sleeve 170 may be disposed in the second connecting member 210C and extend out of the second opening of the second connecting member 210C. A respective power conducting member may extend through the inner sleeve 170 and be connected to the terminal 162. Seal 164*a* may be disposed to seal gaps between the second terminal 162 and the second connecting member 210C. Seal 164*b* may be disposed to seal gaps between the inner sleeve 170 and the second connecting member 210C. A nut 178 may be disposed around the portion of the inner sleeve 170 that extends out of the second connecting member 210C. The second connecting member 210C may include a branch 168, to which a pipe (e.g., pipe 114) may be attached. Branch 168 may be connected to the body of the second connecting member 210C via a connecting ring 166, which may be configured to enable branch 168 to be rotatable. A pipe (e.g., pipe 10) may be attached to the nut 178 and so as to be in fluid communication with the pipe attached to branch 164. In some embodiments, the second connecting member 210C may be made from metal.

In some embodiments, a method of cooling the cable 100 may include flowing coolant into the inlet pipes 30 from the second end 103 of the cable 100 to the first end 101 of the cable 100; directing the coolant to enter the outlet pipes 10 from respective inlet pipes 30 from the first end 101 of the cable 100 and surround the power conducting members; and flowing the coolant out of the outlet pipes 10 from the second end 103 of the cable 100. In some embodiments, the first end 101 of the cable 100 may be connected to a charging gun 200 comprising a plurality of connecting members 230; and directing the coolant to enter the outlet pipes 10 may include flowing the coolant through the connecting members 230 of the charging gun 200. The inventors have recognized and appreciated that such a configuration may enable the coolant to absorb more heat along its flow path and maintain the operating temperature at a desired level, as the coolant may remain at a temperature lower than that of components it encounters along the flow path.

Figure 3A:
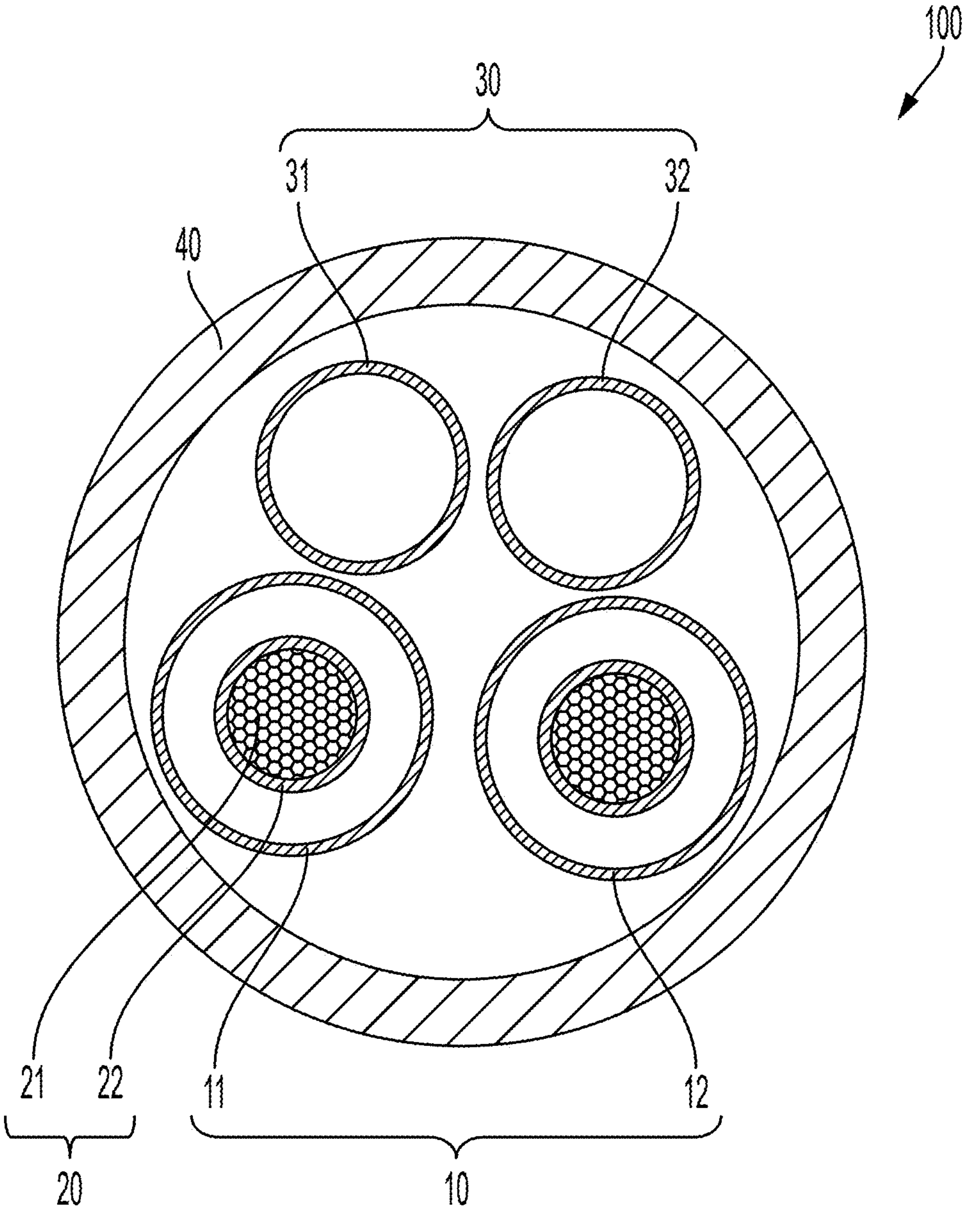
FIGS. 3A to 3E are schematic cross-sectional views of exemplary cables of the charging system of FIG. 1A, looking from a plane perpendicular to a direction the coolant flows, according to some embodiments.
Figure 3B:
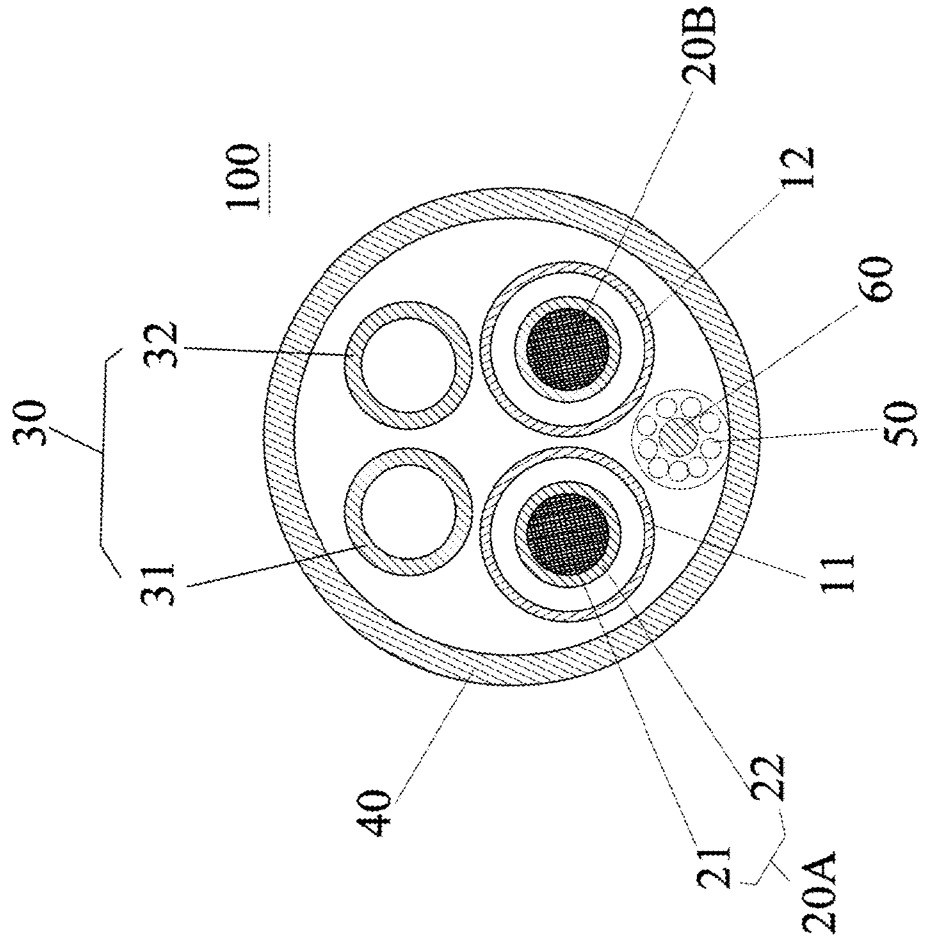

Referring to FIGS. 3A-3B, the outlet pipe 10 may include a first outlet pipe 11 corresponding to the first power conducting member 20A and a second outlet pipe 12 corresponding to the second power conducting member 20B, such that the first power conducting member 20A and the second power conducting member 20B may be respectively cooled by the coolant. The inlet pipe 30 may include a first inlet pipe 31 and a second inlet pipe 32 for supplying coolant to the first outlet pipe 11 and the second outlet pipe 12, respectively.

In some embodiments, the cooling unit 300 of the charging system 1 may comprise a circulation pump for circulating coolant within the cable. For example, one end of each of the first inlet pipe 31 and the second inlet pipe 32 may be connected to an output end of the circulation pump. The other end of each of the first inlet pipe 31 and the second inlet pipe 32 may be connected to a corresponding coolant inlet of the first connecting member 230 of the charging gun 200. One end of each of the first outlet pipe 11 and the second outlet pipe 12 may be connected to a corresponding coolant outlet of the first connecting member 230. The other end of each of the first outlet pipe 11 and the second outlet pipe 12 may be connected to an input end of the circulation pump. The coolant may be circulated in the cable 100 between the cooling unit 300 and the charging gun 200 to carry away heat generated by the power conducting members.

As shown by the arrows in FIGS. 1A-2, during the operation of the charging gun 200, the coolant from the cooling unit 300 may enter the first inlet pipe 31 and the second inlet pipe 32, and then the first outlet pipe 11 and the second outlet pipe 12 via the first connecting member 230, respectively. The coolant flowing in the outlet pipes 11, 12 may surround the power conducting member 20, thereby absorbing and dissipating the heat generated by the power conducting member 20. The coolant may return to the cooling unit 300 through the outlet pipe 10, which may complete a cooling cycle. This process may be continuous so as to maintain the operating temperature of the cable at a desired level.

Optionally, the cooling unit 300 of the charging system 1 may include a heat exchanger, a cooling system controller, and a cooling fan. The heat exchanger and the cooling fan are configured to reduce the temperature of the coolant flowing through the charging pile, so that the overall temperature of the coolant flowing through the cable may be reduced.

Since a large amount of heat may be generated during the charging process, if the heat cannot be dissipated in a timely manner, it will lead to a decrease in the charging speed and even affect the service life of the charging gun 200. By cooling the first power conducting member and the second power conducting member through the first outlet pipe 11 and the second outlet pipe 12 in the cable 100, respectively, it can enable the power conducting member 20 to remain at a relatively low temperature, thereby improving the charging efficiency. The techniques described herein can significantly reduce the operating temperature of the cable, thereby extending its service life.

Techniques described herein may be particularly applicable to advanced energy systems requiring continuous operation under high-load conditions, such as electric vehicle charging stations, public parking facilities, and other installations demanding high power and rapid charging capabilities. In some embodiments, within an electric vehicle charging facility, the charging gun 200 is required to operate reliably under high-current and high-temperature conditions. By continuously supplying coolant through the cooling circulation loop as described above, the operating temperature of the cable connected to the charging gun 200 can be effectively managed, thereby enhancing both charging efficiency and operational safety.

Furthermore, the cable described in the present disclosure is not limited to use with new energy devices (e.g., electric vehicles), but may also be employed in other high-power and/or high-temperature environments to facilitate signal and/or power transmission. For example, the cable may be connected to a data center equipped with high-power graphics processing units (GPUs) to support machine learning applications.

FIGS. 3A-3E illustrate cross-sectional views of cable 100, according to some embodiments, taken along a plane perpendicular to the longitudinal direction of the cable.

Figure 3C:
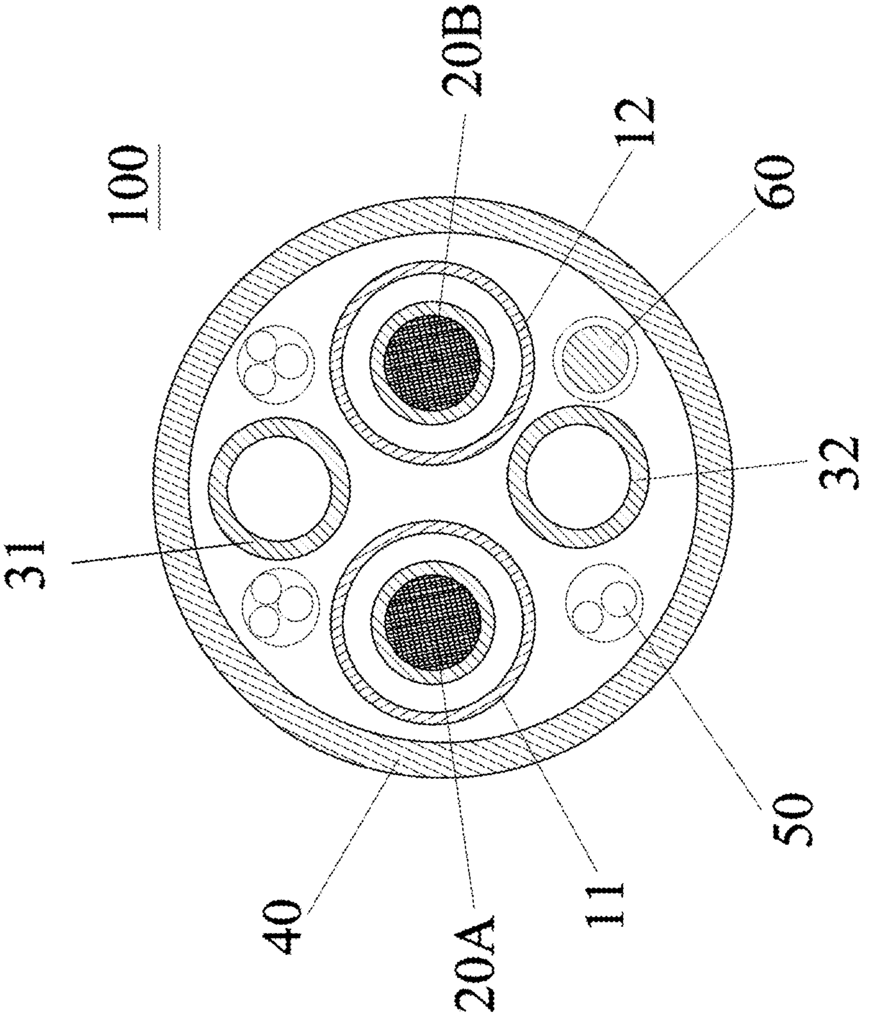
Figure 3D:
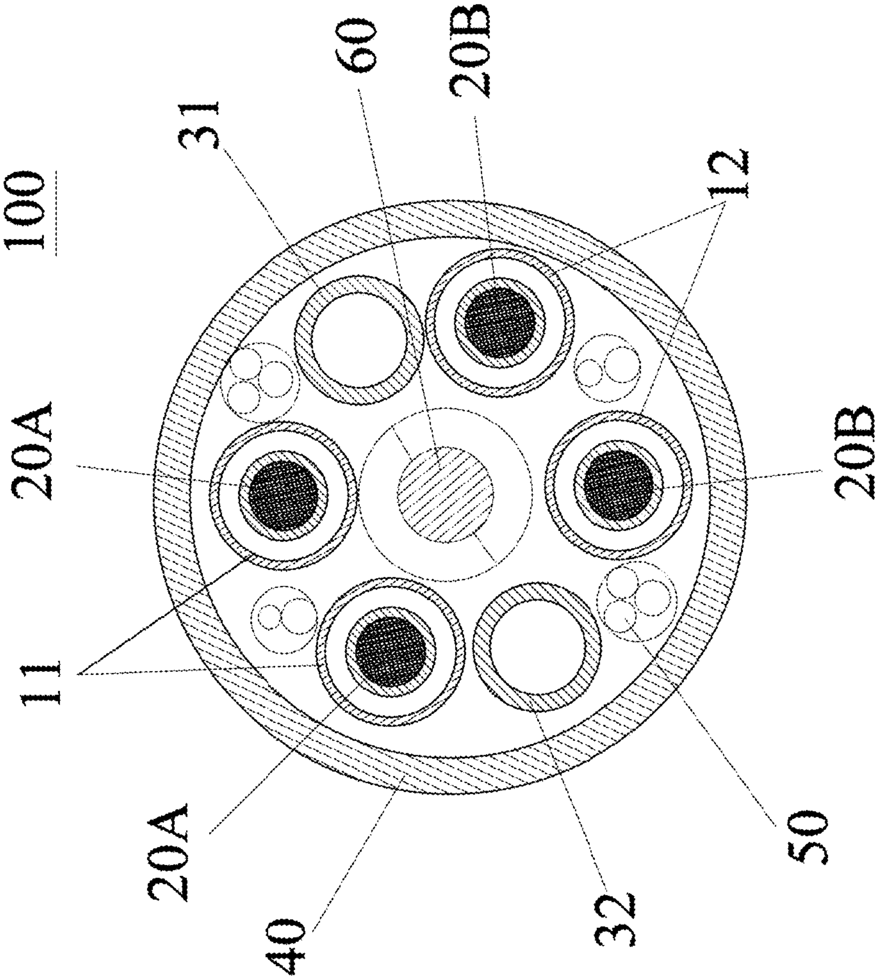
Figure 3E:
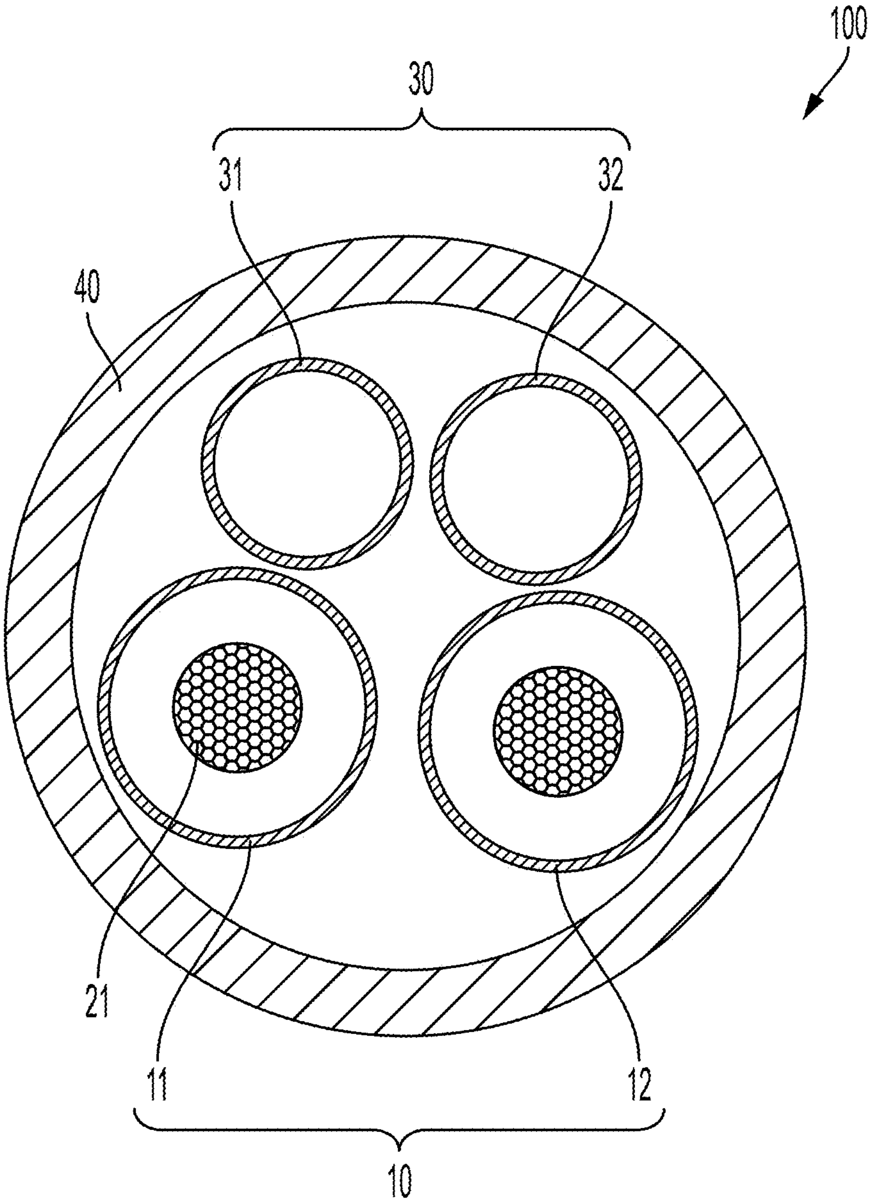

Referring to FIGS. 3A-3B, 3E, the cable 100 may comprise a first power conducting member 20A, a second power conducting member 20B, a first inlet pipe 31, a second inlet pipe 32, a first outlet pipe 11 in fluid communication with the first inlet pipe 31, and a second outlet pipe 12 in fluid communication with the second inlet pipe 32. Optionally, the first outlet pipe 11 may extend substantially parallel to the first inlet pipe 31. The second outlet pipe 12 may extend substantially parallel to the second inlet pipe 32.

The inlet pipe 30 may be configured to facilitate stable and uniform entry of the coolant into the cable 100. The inlet pipe 30 may be sized to control the coolant flow velocity and flow rate, thereby enhancing the heat dissipation efficiency.

The outlet pipe 10 may carry the flowing coolant such that the coolant directly or indirectly surrounds the power conducting member 20. The outlet pipe 10 may be configured to increase the contact area between the coolant and the power conducting member 20, thereby enhancing the heat dissipation efficiency. The outlet pipe 10 may also be configured with high mechanical strength and corrosion resistance, thereby enhancing the reliability of the cable.

In the illustrated example, the first power conducting member 20A is disposed in the first outlet pipe 11, and the second power conducting member 20B is disposed in the second outlet pipe 12. Placing the power conducting member 20 directly inside the outlet pipe 10 enables the power conducting member 20 to directly contact the coolant, thereby rapidly transferring heat to the coolant. Techniques described herein may enhance the heat transfer efficiency, reduce the temperature of the core, and effectively reduce the risk of the power conducting member being damaged or having its performance degraded due to overheating. The inlet pipe 30 and outlet pipe 10 are arranged side by side, which is beneficial for the overall layout and structural optimization of the cable 10, reducing the space occupied by the cable.

As shown in FIGS. 3A, 3B, and 3E, the first inlet pipe 31 and the second inlet pipe 32 may be arranged on the same side of a connecting line that connects a center of the first power conducting member 20A to a center of the second power conducting member 20B. A nominal cross-sectional area of a core of each of the plurality of power conducting members may be in a range of 16 $mm^2$ to 240 $mm^2$. Optionally, a nominal cross-sectional area of a core of each power conducting member may be 25 $mm^2$ or 35 $mm^2$. Optionally, the nominal cross-sectional area of the core of each power conducting member may be 2 AWG (American Wire Gauge).

The cable 100 may further comprise a grounding member 60 having a core with a nominal cross-sectional area in a range of 2 $mm^2$ to 100 $mm^2$. Optionally, a nominal cross-sectional area of the core of the grounding member 60 may be 2 $mm^2$. Optionally, a nominal cross-sectional area of the core of the grounding member 60 may be 14 AWG, 12 AWG, or 10 AWG.

The cable 100 may further comprise a plurality of signal conducting members 50 each having a core with a nominal cross-sectional area in a range of 0.5 $mm^2$ to 2.5 $mm^2$. Optionally, a nominal cross-sectional area of the core of the signal conducting member 50 may be 0.5 $mm^2$ or 0.75 $mm^2$. Optionally, the nominal cross-sectional area of the core of the signal conducting member 50 may be 18 AWG or 20 AWG.

Referring to FIGS. 3A, 3E, the cable 100 may further include a sheath 40, which houses both the outlet pipe 10 and the inlet pipe 30. Positioned as the outermost layer, the sheath 40 may protect the inner components of the cable. The sheath 40 may protect the inner outlet pipe 10 and inlet pipe 30 from damage caused by external factors. In real-world applications, cables are often exposed to harsh physical and chemical environments, such as friction, impact, and corrosion. The sheath 40 may provide a durable barrier that helps minimize damage to the cable's internal structure. By protecting the outlet pipe 10 and the inlet pipe 30 from external damage, the sheath 40 may extend the service life of the cable. The structurally stable cable may enhance safety and reliability during use.

During the manufacturing process, the sheath 40 may be molded by a specific process (e.g., extrusion, injection molding, etc.) and is tightly wrapped around the periphery of the outlet pipe 10 and the inlet pipe 30. During use, the sheath 40 may play a protective role, and whether the cable is bent, stretched, or subjected to external impacts, the sheath 40 may protect the internal pipe structure.

In some embodiments, the cable 100 may comprise padding that fills in between the individual wires. Optionally, the cable may include a metal shielding layer, which is disposed on an outer side of the signal conducting members or an outer side of the filling layer. The metal shielding layer can effectively block the influence of electromagnetic waves, noise, and the like on the cable, and ensure the normal transmission of signals.

Referring to FIGS. 3A, 3E, the power conducting member 20 may comprise a core 21. The outlet pipe 10 may be disposed outside the power conducting member 20 away from the core 21. Coolant may flow between the power conducting member 20 and the outlet pipe 10 to dissipate heat generated by the core 21. In some embodiments, coolant may directly surround the core 21, as illustrated in FIG. 3E. In some embodiments, the power conducting member 20 may include an insulative layer 22 enclosing the core 21, and coolant may flow between the insulative layer 22 and the outlet pipe 10, as illustrated in FIG. 3A.

The core 21 may be made of a metal material, such as copper or aluminum. Its main function may be to transmit current to ensure stable transmission of power or signals. Optionally, the insulative layer 22 may enclose the periphery of the core 21. Optionally, the insulative layer 22 may be made of a high polymer material such as polyethylene, polyvinyl chloride, and the like. The insulative layer 22 may reduce the risk of the core 21 coming into contact with the external environment, reducing the risk of current leakage or external interferences. It should be appreciated that although insulative layer 22 is illustrated in FIGS. 3A-3D, the power conducting member 20 may omit the insulative layer 22 in some embodiments. The power conducting member 20 may be placed directly inside the outlet pipe 10 so that it can come into direct contact with the flowing coolant for efficient heat transfer.

The outlet pipe 10 may be outside the power conducting member 20. It may be made of a fluoroplastic material, which may have corrosion and high temperature resistance. In some embodiments, the outlet pipes may be straight. In some embodiments, the outlet pipe 10 may comprise a corrugated portion 13 or a spiral portion 14, or a combination of a straight segment 15 and a corrugated portion 13/a spiral portion 14 (described in more detail below), which may increase the surface area of the pipe and improve the cooling effect.

When the cable begins to operate, current flows through the core 21, thereby generating heat. This heat is first absorbed and dispersed by the insulative layer 22. At the same time, coolant flows inside the outlet pipe 10. When the coolant comes into contact with the outer surface of the insulative layer 22, it begins to absorb heat from the insulative layer 22. Since the outlet pipe 10 is made of fluoroplastic and includes a corrugated portion 13 or a spiral portion 14, the contact area with the coolant is increased, thereby improving the efficiency of heat transfer. After the coolant absorbs heat, it flows back to the cooling unit through the outlet pipe 10 for recirculation and continuous cooling.

In this process, the flow of the coolant is continuous, which continuously carries away heat from the insulative layer 22 and prevents heat from being accumulated on the insulative layer 22 and the core 21. This can effectively regulate the temperature of the cable, thereby preventing various electrical malfunctions caused by overheating, and ensuring stable operation of the cable.

Referring to FIG. 3C, in a cross-section of the cable 100 perpendicular to the longitudinal direction, the first inlet pipe 31 and the second inlet pipe 32 may be arranged on opposite two sides of a connecting line that connects a center of the first power conducting member 20A to a center of the second power conducting member 20B.

Referring to FIG. 3D, the power conducting members of the cable 100 may include two first power conducting members 20A and two second power conductors 20B. The pipes may comprise two inlet pipes and four outlet pipes. In the illustrated example, the inlet pipe 30 comprises a first inlet pipe 31 and a second inlet pipe 32. The outlet pipes 10 comprise two first outlet pipes 11 in fluid communication with the first inlet pipe 31; and two second outlet pipes 12 in fluid communication with the second inlet pipe 32. Optionally, the two first outlet pipes 11 may extend substantially parallel to the first inlet pipe 31; and the two second outlet pipes 12 may extend substantially parallel to the second inlet pipe 32.

The two first power conducting members 20A may be disposed in the two first outlet pipes 11, respectively. The two second power conducting members 20B may be disposed in the two second outlet pipes 12, respectively. The coolant may flow into the first inlet pipes 31 and the second inlet pipes 32 and exit via the corresponding outlet pipes. A nominal cross-sectional area of a core of each power conducting member may be 25 $mm^2$ or 35 mm 2. Optionally, the nominal cross-sectional area of the core of each power conducting member may be 2 AWG.

The cable 100 may further comprise a grounding member 60 disposed at a substantially central location of the cable 100. A nominal cross-sectional area of the core of the grounding member 60 may be 25 $mm^2$. Optionally, a nominal cross-sectional area of the core of the grounding member 60 may be 3 AWG.

The cable 100 may further comprise a plurality of signal conducting members 50. Optionally, a nominal cross-sectional area of the core of the signal conducting member 50 is 0.5 $mm^2$ or 0.75 $mm^2$. Optionally, the nominal cross-sectional area of the core of the signal conducting member 50 may be 18 AWG or 20 AWG. The cable 100 may also comprise a plurality of communication wires. Optionally, a nominal cross-sectional area of the core of each of the communication wires is 1 $mm^2$.

It should be understood that the number, size and arrangement mode of the power conducting members, grounding members, signal conducting members, communication wires and the like of the cable 100 may not be limited to the exemplary embodiment described above. For example, they may be adjusted according to the individual applications. The cables of the present disclosure may be configured to comply with relevant industry standards, such as GB/T20234.4-2023"Connection Device for Conductive Charging of Electric Vehicles" and GB/T33594-2017 "Electric Vehicle Cable."

Conventional cables with outlet pipes made of cross-linked materials can withstand up to approximately 85° C. during operation; and conventional cables with outlet pipes made of nylon materials can withstand up to approximately 125° C. According to aspects of the present disclosure, the cables with outlet pipes described herein can operate at a maximum operating temperature of approximately 180° C.

Figure 4A:
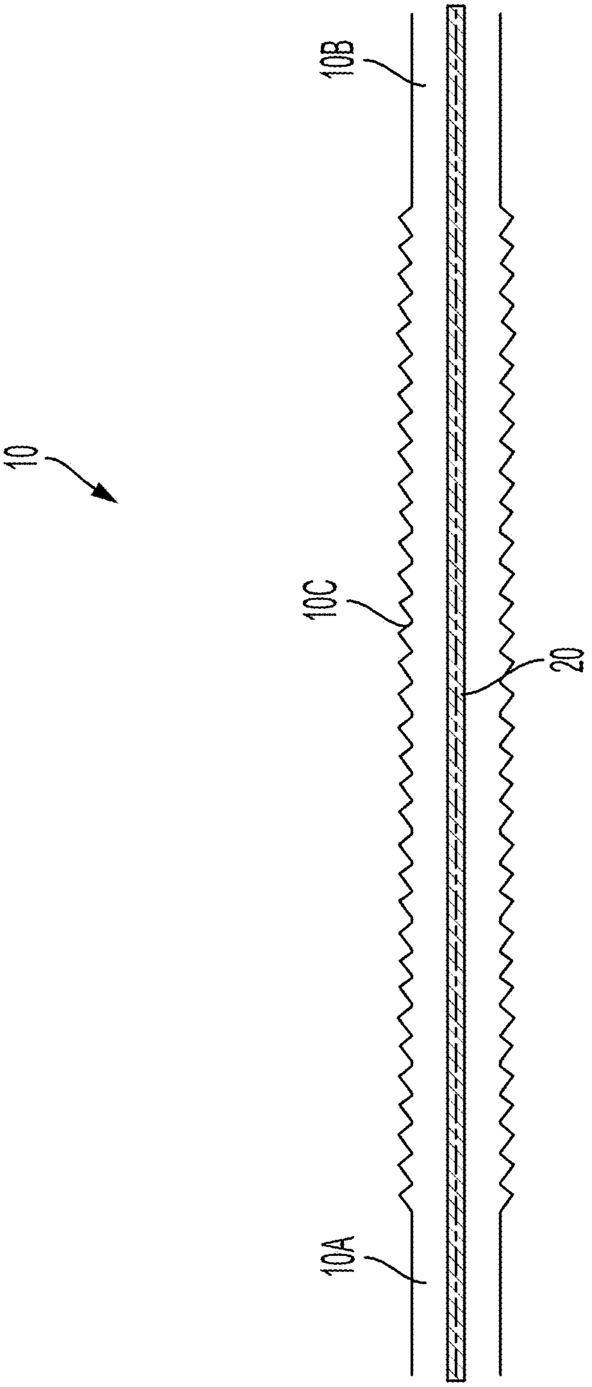
FIGS. 4A to 4I are schematic views of outlet pipes of the cables of FIGS. 3A-3D, according to some embodiments.

FIGS. 4A-4I depict embodiments of the outlet pipe 10 of the cable 100. Referring to FIG. 4A, the outlet pipe 10 may surround the power conducting member 20. A coolant passage for circulation of a coolant may be disposed between an outer peripheral surface of the power conducting member 20 and an inner peripheral surface of the outlet pipe 10. The outlet pipe 10 may comprise a first straight segment 10A adjacent to a first end of the cable, a second straight segment 10B adjacent to a second end of the cable, and an offset segment 10C between the first straight segment 10A and the second straight segment 10B. A distance between a center point of the offset segment 10C in a longitudinal direction and the charging gun 200 may be in a range of 1 meter to 15 meters.

In an optional embodiment, the offset segment 10C may be at least one of a corrugated portion 13 or a spiral portion 14. The length of the offset segment 10C may be 1% to 100% of the length of the outlet pipe 10. Optionally, the length of the offset segment 10C is about 20% to 80% of the length of the outlet pipe 10.

As shown in FIGS. 4A-4I, the outlet pipe 10 may include the corrugated portion 13, the spiral portion 14, or a combination of both the corrugated portion 13 and the spiral portion 14. In some embodiments, one section of the outlet pipe 10 is a straight segment 15, and the other section is either the corrugated portion 13 or the spiral portion 14; or a combination of both the corrugated portion 13 and the spiral portion 14.

The outlet pipe 10 includes a corrugated portion 13 or spiral portion 14, or with a combination of the straight segment 15 and the corrugated portion 13 or the spiral portion 14. The corrugated portion 13 or the spiral portion 14 may enable the cable to have improved flexibility, bending performance, and adaptability, making it to capable of accommodating various complex installation layouts and bending requirements. The corrugated or threaded structure increases the surface area of the outlet pipe 10, improves the flow speed of the coolant and the heat dissipation efficiency, and further enhances the heat dissipation performance of the cable.

The combination of the straight segment 15 and the corrugated portion 13 or the spiral portion 14 may enable the cable to maintain sufficient rigidity in areas requiring stable support, while also providing flexibility in sections where bending is needed. During equipment wiring, the cable can be bent and twisted as needed based on actual requirements, and the corrugated part 13 or the spiral part 14 may enable the cable to adapt to these deformations, while maintaining the smooth circulation of the internal coolant. The cable described herein may be particularly well-suited for applications involving frequent bending or movement, such as electric vehicle cables, energy transmission wires for robotic arms, and the like.

In some embodiments, the inlet pipe 30 may consist of a straight segment. In some embodiments, the inlet pipe 30 may comprise a corrugated portion 13 and/or a spiral portion 14.

In some embodiments, the inlet pipe 30 and/or the outlet pipe 10 may be made of fluoroplastic. The high corrosion resistance of fluoroplastics ensures that the pipes will not be eroded by the coolant over a long period of time. The high temperature resistance of fluoroplastics ensures that the pipes maintain stable performance even in high-temperature operating conditions. In addition, the insulating property of the fluoroplastic helps to ensure the overall safety of the cable.

With the outlet pipe 10, the inlet pipe 30, the power conducting member 20, and the corrugated portion 13 or the spiral portion 14, the cable 100 may realize high efficiency heat dissipation, corrosion resistance, desired insulating properties, and flexibility, which provides strong support for the stable operation of new energy devices. These features enable the cable to operate effectively in various demanding environments, thereby satisfying the efficiency, safety, and reliability requirements of new energy devices.

In each of the embodiments of the outlet pipe shown in FIGS. 4A-4I, the offset segment of the outlet pipe 10 comprises one or both of a corrugated portion and a spiral portion.

Figure 4B:
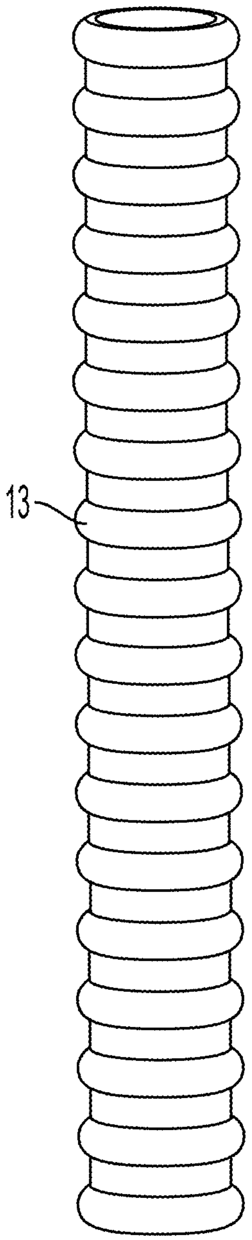
Figure 4C:
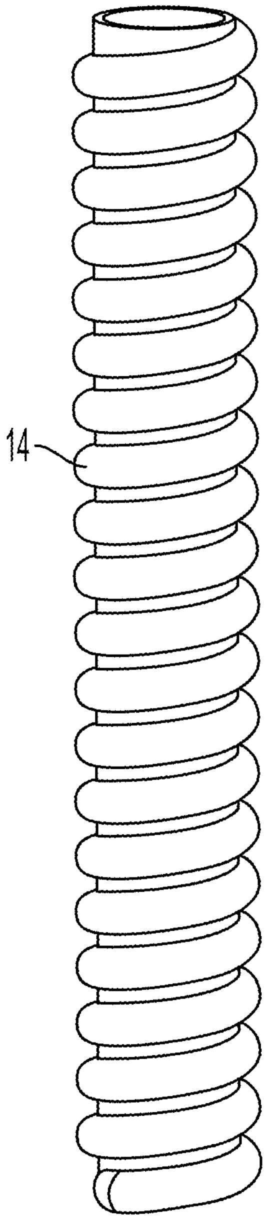

In the embodiments shown in FIGS. 4B-4C, the outlet pipe 10 in the cable 100 may include a corrugated portion 13 or a spiral portion 14.

In some embodiments, the outlet pipe 10 may be the primary pipe for coolant flow in the liquid-cooled cable, playing a critical role in the cable's cooling efficiency and overall performance. The corrugated portion 13 may feature a continuous structure with uniform internal and external corrugation. This configuration may provide flexibility, enabling it to accommodate bending and twisting during use. Additionally, the increased surface area from the corrugation may enhance the pipe's heat dissipation capabilities.

The pipe surface of the spiral portion 14 may have a thread-like concave-convex structure. This structure not only enhances the mechanical strength of the pipe, but also increases the contact area between the pipe and the coolant to a certain extent, thereby improving the cooling efficiency. In addition, the spiral portion 14 also has flexibility and can adapt to the bending needs of the cable.

Figure 5A:
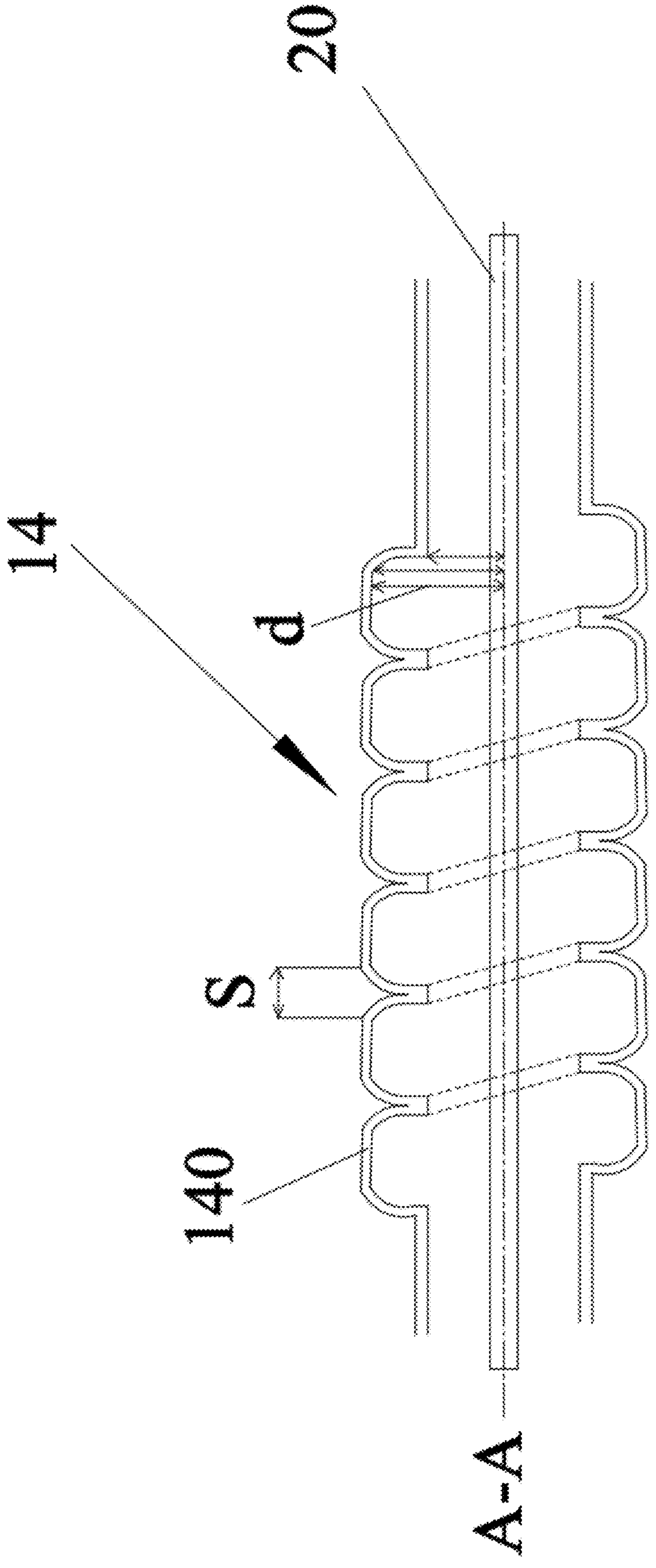
FIG. 5A is an enlarged cross-sectional view of a spiral portion of an outlet pipe of a cable, looking from a plane parallel to the direction the coolant flows, according to some embodiments.

The structures of the corrugated portion 13 and the spiral portion 14 are next described with reference to FIGS. 5A-5C. FIG. 5A shows a longitudinal cross-sectional view of the spiral portion 14 of the outlet pipe 10 of a cable, according to some embodiments, taken along a plane parallel to the longitudinal direction of the cable. The spiral portion 14 may comprise a convex portion 140 extending in a spiral configuration around a center axis of the outlet pipe 10. In the illustrated longitudinal cross-sectional view of the outlet pipe 10, the spiral portion 14 comprises a plurality of protruding portions (e.g., protruding cavities) protruding in a radial direction of the outlet pipe 10. The protruding portions may include the convex portions 140, and a space S may be disposed between adjacent protruding portions. The plurality of protruding portions are configured such that when the cable 100 is bent, the space S varies under the bending force to accommodate the relative movement of the adjacent protruding portions. Optionally, the plurality of protruding portions in a linear array along the length of the outlet pipe 10 may be identical. The space between adjacent protruding portions may enhance the flexibility of the outlet pipe 10, enabling it to better accommodate the bending and twisting of the cable. In some embodiments, in a longitudinal cross-sectional view of the outlet pipe 10, the protruding portions of the spiral portion 14 may have a V-shaped, U-shaped, or trapezoidal cross-section.

In some embodiments, as shown in FIG. 5A, outlet pipe 10 may comprise an offset segment. In a longitudinal cross-sectional view of the pipe 10, a distance d in the radial direction of the outlet pipe 10 between an inner peripheral surface of the offset segment and a center axis A-A of the corresponding power conducting member 20 may vary along the longitudinal direction of the pipe 10. The offset segment may correspond to a protruding portion that extends radially outward.

In some embodiments, the offset segment may comprise a plurality of corrugated portions 13 and/or a plurality of spiral portions 14.

In some embodiments, the length of the offset segment may be based on requirements of individual applications. For example, in some embodiments, the length of the offset segment may range from 1% to 100% of the length of the outlet pipe, including subranges such as from 10% to 90%, from 20% to 80%, or from 30% to 70%.

A bending radius R of the offset segment may be in a range of four times to ten times an outer diameter (e.g., distance d) of the outlet pipe 10. A bending radius R of the cable 100 may be in a range of four times to ten times an outer diameter of the cable 100.

In some embodiments, the cable 100 may have an outer diameter in a range of 20 mm to 70 mm. Compared to conventional cables, the cable described herein may provide improved heat dissipation efficiency, enabling the use of thinner conducting members for the same current load. This results in a lighter and more compact cable, enhancing flexibility while also reducing manufacturing and transportation costs.

Figure 5B:
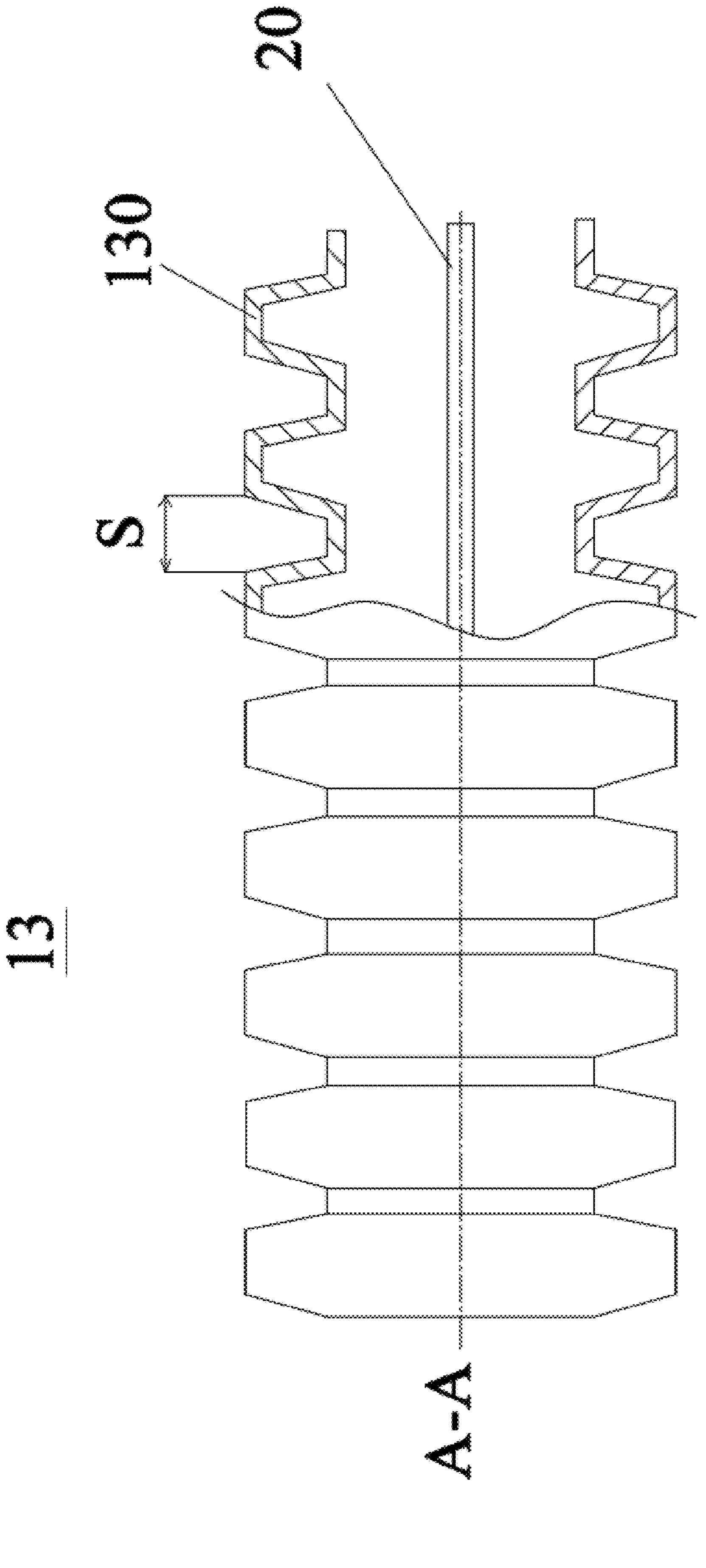
FIG. 5B is an enlarged partial cross-sectional view of a corrugated portion of an outlet pipe of a cable, looking from a plane parallel to the direction the coolant flows, according to some embodiments.
Figure 5C:
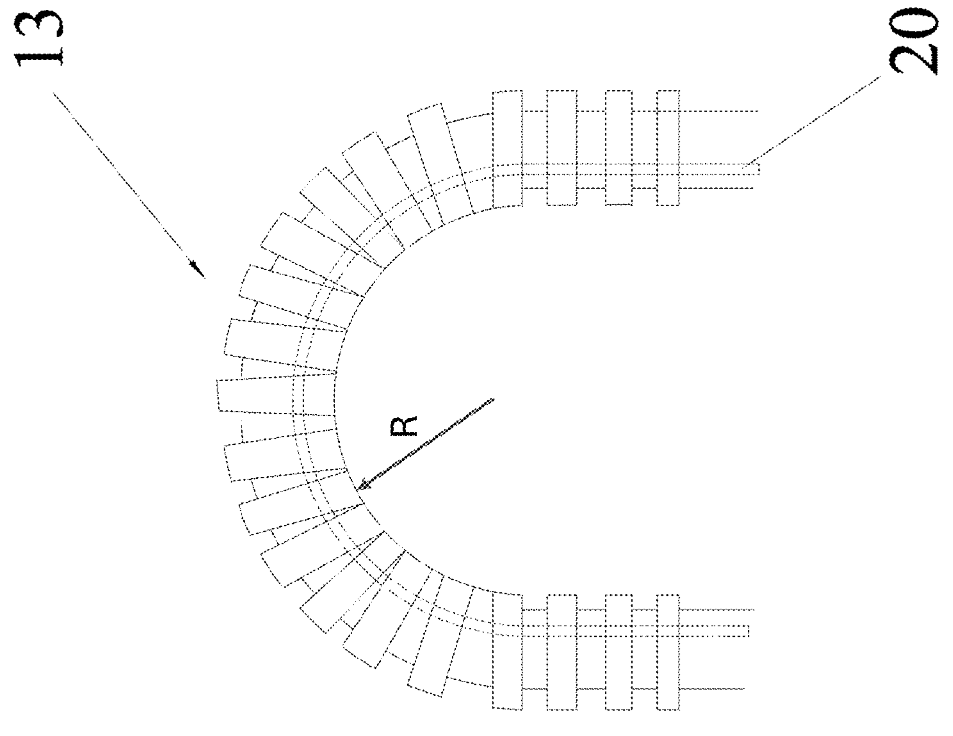
FIG. 5C is a schematic view illustrating the corrugated portion of FIG. 5B, bent with a bending radius.

FIG. 5B is a longitudinal cross-sectional view of a corrugated portion 13 of the outlet pipe 10 of a cable, according to some embodiments. FIG. 5C is a schematic view of the corrugated portion 13 shown in FIG. 5B in a flexed state. As illustrated, the corrugated portion 13 comprises a plurality of convex portions 130 arranged to be spaced apart from each other. The respective convex portions 130 extend in a circumferential direction of the outlet pipe 10. The convex portions 130 may be spaced apart from each other at a constant spacing, or spaced apart from each other at a variable spacing in the longitudinal direction of the outlet pipe. In some embodiments, in a longitudinal cross-sectional view of the corrugated portion 13, each convex portion 130 may have a V-shaped, U-shaped, or trapezoidal cross-section.

As shown in FIG. 5B, in the longitudinal cross-sectional view of the outlet pipe 10, the corrugated portion 13 may comprise a plurality of protruding portions 130 (e.g., protruding cavities) protruding in a radial direction of the outlet pipe 10. A space S may be disposed between adjacent protruding portions. The plurality of protruding portions may be configured such that when the cable 100 is bent, the space S varies under the bending force to adapt to the relative movement of the adjacent protruding portions. Optionally, the plurality of protruding portions in a linear array along the length of the outlet pipe 10 may be identical. When the corrugated portion 13 is bent, adjacent protruding portions of the plurality of protruding portions may move relative to each other under the bending force. The concave space between the adjacent protruding portions may enhance the flexibility of the outlet pipe 10, enabling it to bend more easily and accommodate the curvature and torsion of the cable 100.

With the outlet pipe 10 comprising a plurality of corrugated portions 13 or spiral portions 14, the overall flexibility of the cable is significantly improved. This may enable the cable to effectively accommodate various bending and twisting scenarios, such as the frequent movement and bending of the charging gun 200 for new energy vehicles, ensuring the cable's stability and reliability.

It should also be appreciated that the concave and convex structural configuration of the corrugated portion 13 and the spiral portion 14 may increase the contact area between the pipe and the coolant, thereby improving the heat dissipation efficiency. This may enable rapid and efficient dissipation of heat generated by the power conducting member 20, ensuring stable cable operation in high-temperature environments.

In some embodiments, both the corrugated portion 13 and the spiral portion 14 can be independently fabricated and then joined. The modular configuration of the corrugated portion 13 and the spiral portion 14 may enable easy assembly and connection based on specific requirements, thus simplifying the manufacturing process. It should also be appreciated that this configuration may reduce manufacturing cost and improve production efficiency.

In some embodiments, the corrugated portion 13 and the spiral portion 14 may have high structural strength, providing resistance to external pressure and impact. In some embodiments, the flexibility and heat dissipation capabilities of the corrugated portion 13 and/or the spiral portion 14 may help extend the service life of the cable and enhancing overall reliability.

In some embodiments, the coolant enters the outlet pipe 10 comprising a plurality of corrugated portions 13 or spiral portions 14 through the inlet pipe 30. While flowing through the individual pipe sections, the coolant exchanges heat with the insulative layer 22 on the power conducting member (power conducting wire) 20, and thus the heat generated by the power conducting wire 20 is dissipated. The configuration of the corrugated portion 13 and the spiral portion 14 may enhance the flow of the coolant within the pipe, ensuring uniform distribution and sufficient volume, thereby enabling efficient heat dissipation.

As the cable bends and moves, individual pipe segments in the outlet pipe 10 may bend and twist. The flexibility of the corrugated portion 13 and the spiral portion 14 may enable them to accommodate deformations, ensuring continuous and stable coolant flow.

Figure 4D:
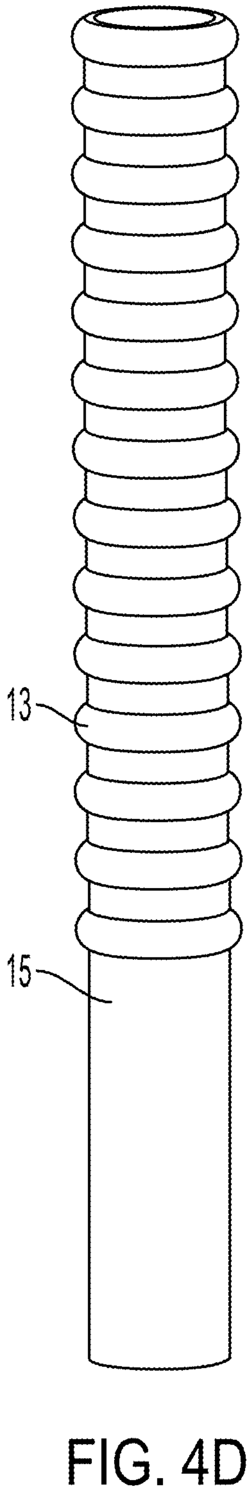

In the example illustrated in FIG. 4D, the outlet pipe 10 comprises a segment of straight segment 15 and a segment of corrugated portion 13, which are connected with each other. In the example illustrated in FIG. 4E, the outlet pipe 10 comprises a segment of straight segment 15 and a segment of spiral portion 14, which are connected with each other.

Figure 4E:
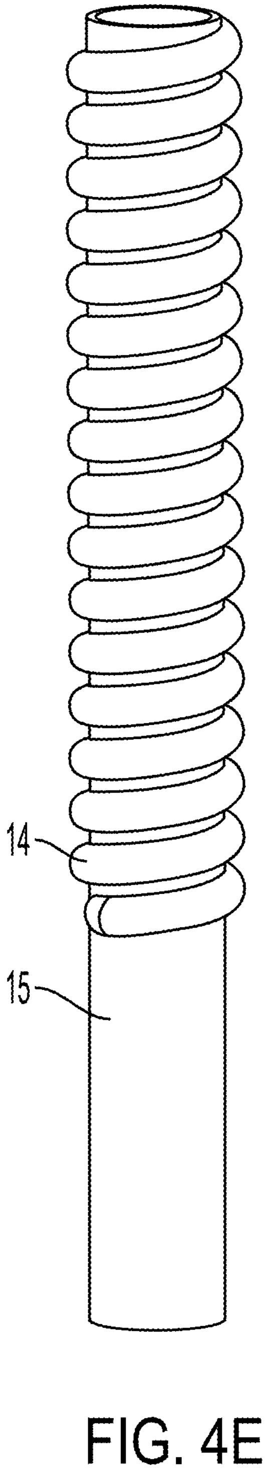

Referring to FIGS. 4D-4E, the straight segment 15 may be configured to maintain the overall structural integrity and strength of the cable, particularly in areas requiring shape retention or rigidity. The straight segment 15 may serve as a connecting portion to facilitate integration with other components or devices. For example, the configuration of the straight segment 15 may simplify the installation and maintenance of the inlet pipe 30. During installation, the straight segment 15 may interface relatively easily with the second connecting member 210 and other components. During maintenance, the relatively simple structure of the straight segment 15 may enable straightforward inspection and replacement. The straight segment 15 may be made of a composite cross-linked pipe material.

The corrugated portion 13 or the spiral portion 14 may be configured to enhance the heat dissipation performance of the cable. The shape of the corrugated portion 13 can increase the contact area with the coolant, thereby improving the heat dissipation efficiency. The spiral portion 14 forms more flow channels with its spiral structure, facilitating the coolant flow and enhancing heat dissipation.

The configuration comprising the straight segment 15 in combination with the corrugated portion 13 or the spiral portion 14 may ensure structural stability of the cable and enhance its heat dissipation performance. This arrangement may be particularly effective in high-load and high-temperature operating environments, where it may help to prevent cable overheating and extend service life. By integrating the characteristics of the straight segment with those of the corrugated or spiral portions, the cable may accommodate a broader range of working conditions and installation requirements. Whether the application requires shape retention or improved thermal management, this combined configuration may provide versatile adaptability.

In some embodiments, during use, the coolant enters the outlet pipe 10 of the cable through the inlet pipe 30. In the portion of the straight segment 15, the coolant maintains a steady flow. When the coolant enters the corrugated portion 13 or the spiral portion 14, the flow of the coolant becomes more complex and turbulent due to its special shape and structure, thereby increasing the contact area with the cable and the heat dissipation effect. With this configuration, the coolant is able to dissipate the heat generated by the power conducting member 20 more effectively, ensuring stable operation of the cable.

Figure 4F:
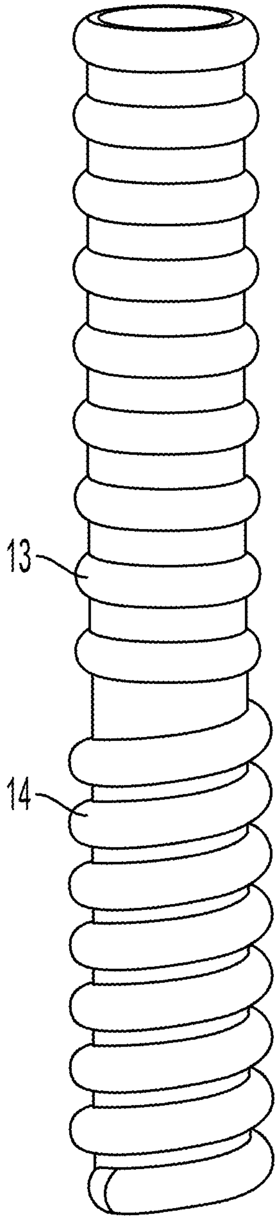
Figure 4G:
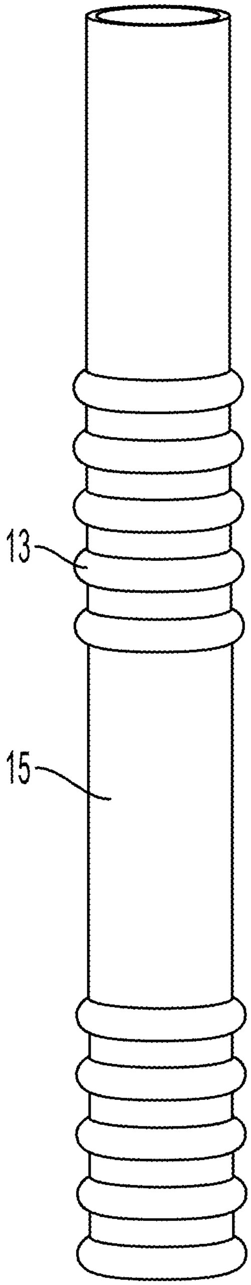
Figure 4H:
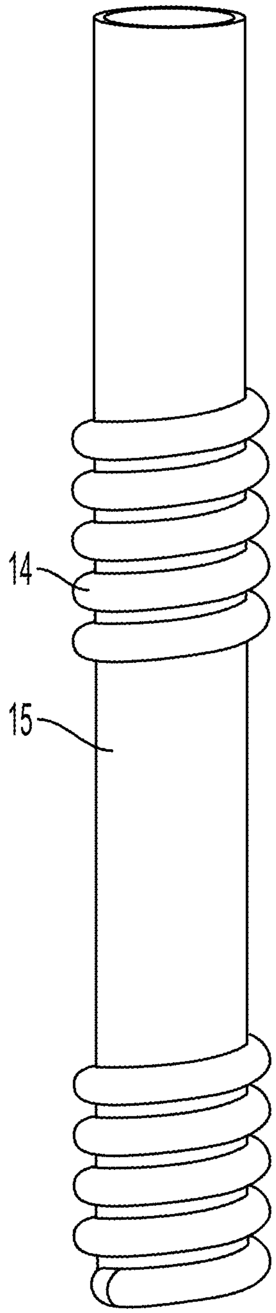
Figure 4I:
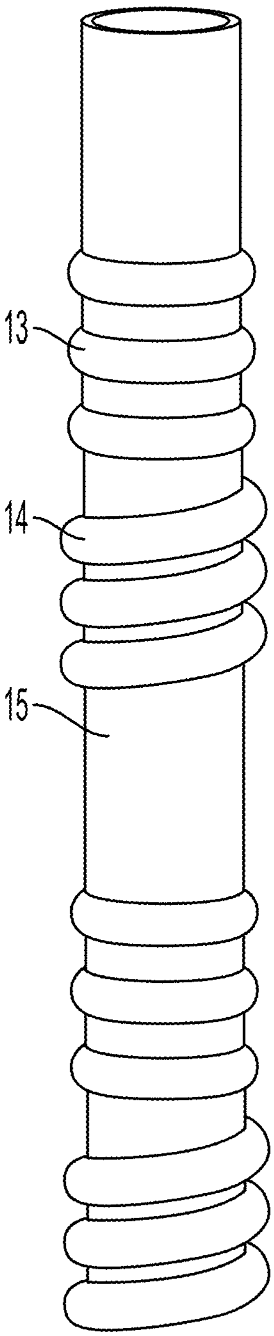

Referring to FIG. 4F and FIG. 4I, the combined use of the corrugated portion 13 and the spiral portion 14 can significantly improve the performance of the cable, especially in the high load and high temperature working environment, and can effectively extend the service life of the cable. Through the combined configuration, the cable can be adaptable to a wider range of working environments, offering a versatile solution for diverse application scenarios. Compared with the single use of high-cost special pipe material, the combined use of the corrugated portion 13 and the spiral portion 14 can not only ensure the product's performance but also reduce material costs, thereby enhancing the product's competitive edge.

During use, the coolant enters the outlet pipe 10 through the inlet pipe 30 and flows inside the outlet pipe 10. Since the outlet pipe 10 is combined by a plurality of corrugated portions 13 and a plurality of spiral portions 14, the varying degrees of heat dissipation by the coolant is achieved as the coolant flows through different sections. The special shape of the corrugated portion 13 can increase the contact area with the coolant and improve the heat exchange efficiency, while the threaded structure of the spiral portion 14 further enhances the heat dissipation effect. By this combined configuration, the outlet pipe 10 is able to realize efficient heat dissipation on the whole and ensure that the temperature of the power conducting member 20 is always kept within a safe range.

Referring to FIG. 4G, the outlet pipe 10 comprises a plurality of straight segments 15 and a plurality of corrugated sections 13, that are connected with the straight segments 15. Referring to FIG. 4H, the outlet pipe 10 comprises a plurality of straight segments 15 and a plurality of corrugated portions 14, that are connected with the straight segments 15. Referring to FIG. 4I, the outlet pipe 10 comprises a plurality of straight segments 15, a plurality of corrugated portions 13 and a plurality of spiral portions 14, that are connected together.

Referring to FIGS. 4G-4I, the portion of the straight segment 15 is configured to maintain the overall structural stability of the cable, particularly in application scenarios where the cable is required to maintain a straight line or a specific shape. The straight segment 15 also provides a fluid passage for the coolant to flow smoothly. As mentioned earlier, the corrugated portion 13 increases the contact area with the coolant by the structure, thereby improving the heat dissipation efficiency. In addition, the corrugated portion 13 has a certain degree of flexibility and can accommodate the deformation of the cable when it is bent or twisted. The spiral portion 14 enhances the fluidity and mixing effect of the coolant through its spiral structure, further improving the heat dissipation performance. At the same time, the spiral portion 14 also has a certain structural strength and can support the overall structure of the cable.

When the outlet pipe 10 comprises a plurality of corrugated portions 13 and/or a plurality of spiral portions 14, the outlet pipe 10 may not be a pipe with a constant cross-section, but rather include multiple pipe segments, connected in a specific arrangement (e.g., by a connecting member an integrated molding technique).

Referring to FIGS. 4G-4I, during use, the coolant enters the outlet pipe 10 of the cable through the inlet pipe 30. In the portion of the straight segment 15, the coolant maintains a steady flow. When the coolant enters the corrugated portion 13 or the spiral portion 14, the flow of the coolant becomes more complex and turbulent due to its special shape and structure, which increases the turbulence of the coolant. This increased turbulence enhances the coolant's heat exchange area, thereby improving the heat transfer efficiency. With this configuration, the coolant is able to dissipate the heat generated by the power conducting member 20 more effectively, ensuring stable operation of the cable.

In practice, the coolant enters the outlet pipes 11 and 12, comprising a plurality of corrugated portions 13 and/or spiral portions 14, via the first inlet pipe 31 and the second inlet pipe 32. As the coolant flows through the individual pipe segments, the coolant exchanges heat with the power conducting member 20 and dissipate the heat generated by the power conducting member 20. Due to the special structure of the corrugated portions 13 and/or the spiral portions 14, the flow of the coolant inside the pipes is more uniform and sufficient, thereby realizing an efficient heat dissipation effect. In addition, the corrugated portion 13 and the spiral portion 14 are capable of compensating for the thermal deformation of the outlet pipe 10 due to temperature variations, thereby reducing the stress and stress concentration in the pipe.

In some embodiments, the bending radius of the offset segment (e.g., the corrugated portion 13 and/or the spiral portion 14) is in a range of four times to ten times the outer diameter of the outlet pipe. The bending radius of the cable is in a range of four times to ten times the outer diameter of the cable.

The bending radius of the cable described herein is the radius of the arc to which the cable can be safely bent without damaging its internal conductors and insulative layer. This parameter affects the service life and reliability of the cables for electric vehicles. The smaller the bending radius of the cable is, the greater the degree of curvature the cable can achieve.

It should be understood that the outlet pipes of the cables described herein may not be limited to the embodiment shown in FIGS. 4A-4I. For example, the size and arrangement mode of the offset segment of the outlet pipe may be adjusted according to individual applications.

FIGS. 6A-6D illustrate charts illustrating temperature changes over time of exemplary cables with techniques described herein to provide various current levels, compared with non-liquid-cooled charging socket data. Coolant (e.g., oil) is supplied at a rate of 2 liters per minute (2 LPM). A cable according to the present disclosure may comprise a plurality of pipes each enclosing a power conducting member, and each pipe comprises an offset segment (e.g., a spiral portion and a corrugated portion). The illustrated graphs comprise temperature variation curves over time for a charging socket DC positive electrode (Inlet DC+) and a charging socket DC negative electrode (Inlet DC−) of an electric vehicle. The charging socket DC positive electrode (Inlet DC+) and the charging socket DC negative electrode (Inlet DC−) are electrically connected to a charging gun and are of a conventional cable, which is used herein as a comparative example. It should be understood that in the graphs shown in FIGS. 6A-6D, the temperature curves of the DC positive terminal (Coupler DC+) may substantially overlap the respective temperature curves of the DC negative terminal (Coupler DC−).

Figure 6A:
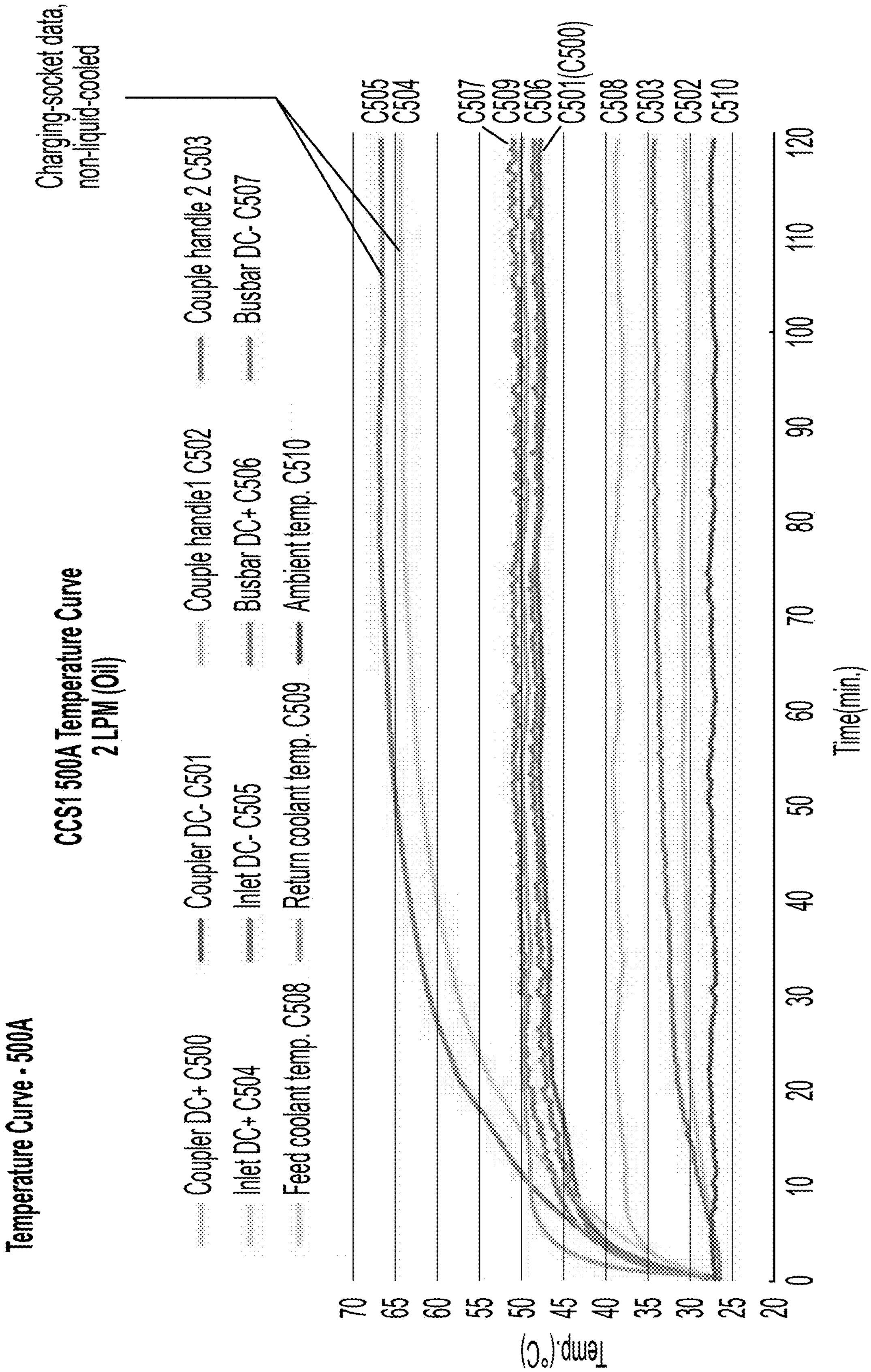
FIGS. 6A to 6D are charts illustrating temperature changes over time of exemplary cables with techniques described herein to provide various current levels, compared with compared with non-liquid-cooled charging socket data.

FIG. 6A illustrates a graph showing the temperature variation of cables under the application of a 500 A rated direct current (DC). As illustrated, during the operation of the cable 100 for a period of approximately 60 to 120 minutes, the charging socket DC negative electrode (Inlet DC−) reaches a temperature in a range of approximately 65° C. to 70° C. (as indicated by curve C505). In comparison, during the same time interval, the DC negative copper busbar (Busbar DC−), as an example of the DC negative power conducting member of the cable 100, maintains a lower temperature range of approximately 50° C. to 55° C. (as indicated by curve C507). Similarly, the DC positive copper busbar (Busbar DC+), as an example of the DC positive power conducting member of the cable 100, exhibits a temperature range of approximately 45° C. to 50° C. (as indicated by curve C506).

Figure 6B:
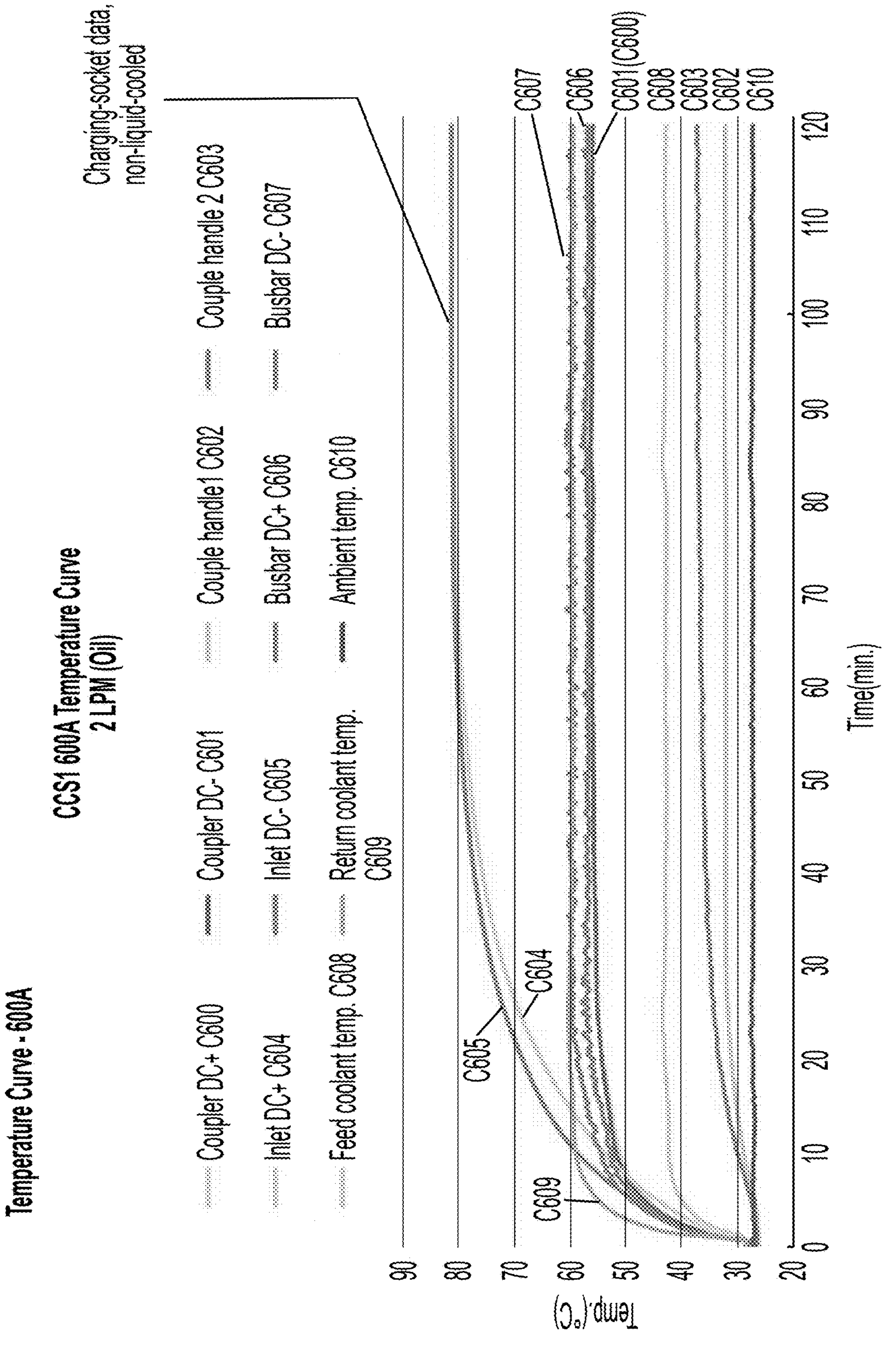

FIG. 6B illustrates a graph showing the temperature variation of cables under the application of a 600 A rated DC. As illustrated, during the operation of the cable 100 for a period of approximately 60 to 120 minutes, the charging socket DC negative electrode (Inlet DC−) reaches a temperature of approximately 80° C. (as indicated by curve C605). In comparison, during the same time interval, the DC negative copper busbar maintains a lower temperature of approximately 60° C. (as indicated by curve C607). Similarly, the DC positive copper busbar (Busbar DC+) exhibits a temperature range of approximately 55° C. to 60° C. (as indicated by curve C606).

Figure 6C:
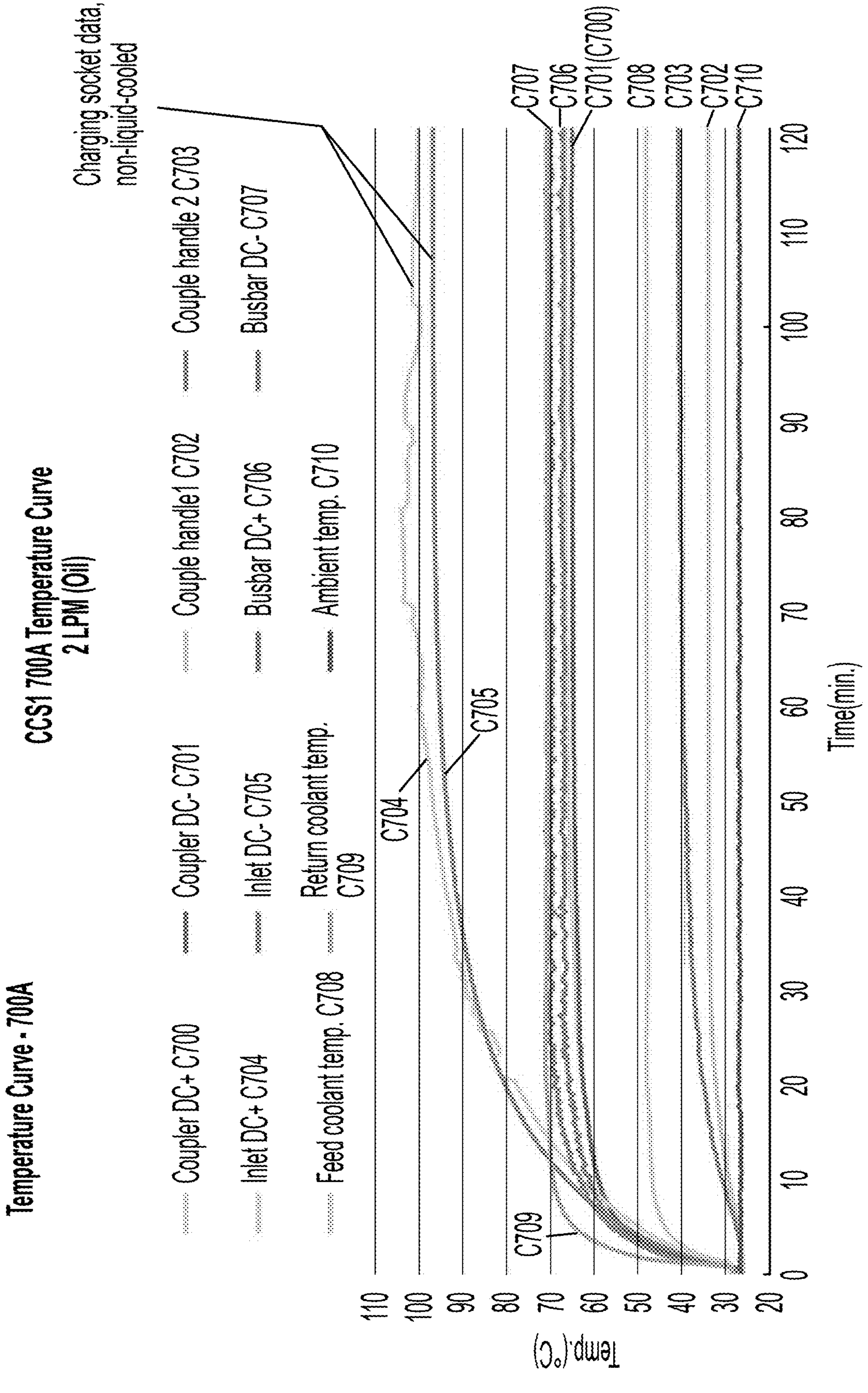

FIG. 6C illustrates a graph showing the temperature variation of cables under the application of a 700 A rated DC. As illustrated, during the operation of the cable 100 for a period of approximately 60 to 120 minutes, the charging socket DC negative electrode (Inlet DC−) reaches a temperature in a range of approximately 95° C. to 100° C. (as indicated by curve C705). In comparison, during the same time interval, the DC negative copper busbar maintains at a lower temperature about 70° C. (as indicated by curve C707). Similarly, the DC positive copper busbar (Busbar DC+) exhibits a temperature range of approximately 65° C. to 70° C. (as indicated by curve C706).

Figure 6D:
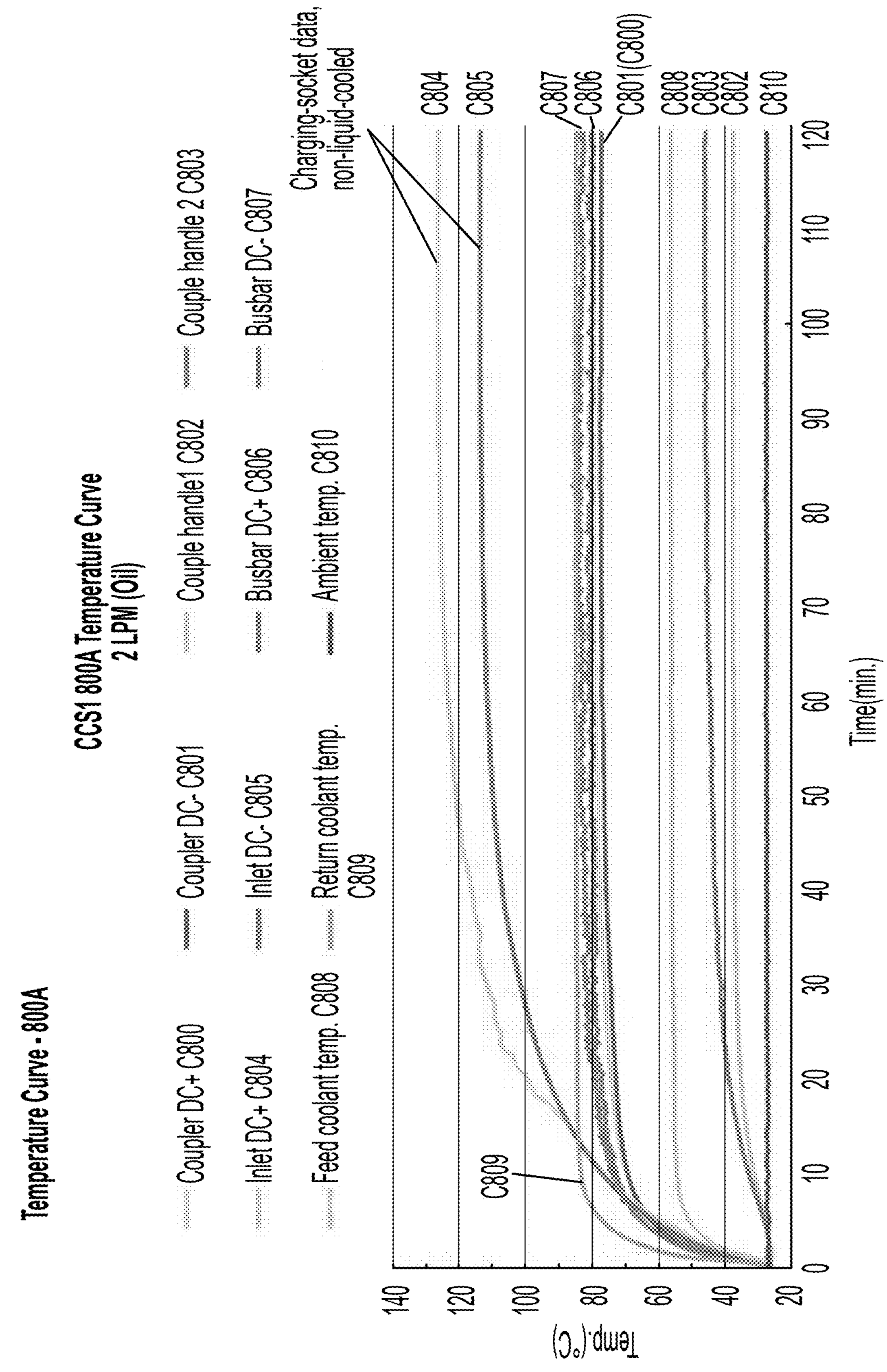

FIG. 6D illustrates a graph showing the temperature variation of cables under the application of a 800 A rated DC. As illustrated, during the operation of the cable 100 for a period of approximately 60 to 120 minutes, the charging socket DC negative electrode and DC positive electrode (Inlet DC− and Inlet DC+) reach a temperature in a range from 100° C. to 130° C. (as indicated by curves C804 and C805). In comparison, during the same time interval, the DC negative copper busbar (Busbar DC−) maintains a lower temperature of about 80° C. (as indicated by curve C807). Similarly, the DC positive copper busbar (Busbar DC+) exhibits a temperature range of approximately 70° C. to 80° C. (as indicated by curve C806).

As illustrated, under the application of a rated direct current (DC) in the range of 500 A to 800 A, the temperature of the power conducting members of the cable 100 remains within approximately 50° C. to 85° C. Compared to conventional charging sockets, the cable according to the present disclosure exhibits reduced operating temperatures in its power conducting members. The cables described herein can dissipate the heat generated by the power conducting members more efficiently, which may contribute to stable operation. The improved heat dissipation efficiency may facilitate faster charging and extend the overall service life of the cable It should be appreciated that although the techniques are described in connection with charging gun 200 for the new energy vehicle, the techniques described herein may be used in other high power, high load or high integration electrical devices. For example, in wind power generation and photovoltaic power generation systems, conventional cables are prone to damage due to overheating as these devices needs to run for a long time and under high-load conditions. The cables described herein may effectively address the heat dissipation problem, enhance operation stability, and extend the device's service life.

Some embodiments relate to a liquid-cooled cable for new energy devices, wherein a conducting member may be cooled by flowing coolant. The cable may include a pipe in which the coolant may circulate, and a conducting member disposed in the pipe; and the pipe may include one or more of a straight segment, a corrugated portion, and a spiral portion.

In some embodiments, the pipe is an outlet pipe, and the conducting member is disposed within the outlet pipe. The liquid-cooled cable may comprise an inlet pipe, which may be disposed side-by-side with the outlet pipe, and communicated with the outlet pipe via a connecting member. The pipe is made of fluoroplastic.

In some embodiments, the cable may be connected to a charging gun, and the conducting member comprises a plurality of first power conducting members and a plurality of second power conducting members, which are electrically connected to the charging gun. The outlet pipes comprise a plurality of first outlet pipes which are in one-to-one correspondence with the plurality of first power conducting members, and a plurality of second outlet pipes which are in one-to-one correspondence with the plurality of second power conducting members. The inlet pipes comprise a plurality of first inlet pipes which are in one-to-one correspondence with the plurality of first outlet pipes, and a plurality of second inlet pipes which are in one-to-one correspondence with the plurality of second outlet pipes.

In some embodiments, the conducting member comprises a core and an insulative layer enclosing the core; the outlet pipes are disposed on a side of the insulative layer away from the core, and the coolant flows between the insulative layer and the outlet pipes to dissipate heat generated by the core.

In some embodiments, the pipe comprises a plurality of corrugated portions, or a plurality of spiral portions.

In some embodiments, the pipe is a combination of a plurality of the corrugated portions and a plurality of the spiral portions.

In some embodiments, the pipe comprises a straight segment and a corrugated portion connected to the straight segment; or the pipe comprises a straight segment and a spiral portion connected to the straight segment.

In some embodiments, the pipe comprises a plurality of straight segments and a plurality of corrugated portions that are connected to the number of straight segments; or, the pipe comprises a plurality of straight segments and a plurality of spiral portions that are connected to the number of straight segments; or, the pipe comprises a plurality of straight segments, a plurality of corrugated portions, and a plurality of spiral portions, that are connected together.

In some embodiments, the present disclosure further provides a charging gun for new energy vehicles, and the charging gun comprises the aforementioned liquid-cooled cable for the new energy device.

In some embodiments, the flexibility of the cable during bending may be enhanced, by providing the outlet pipe with a corrugated portion or a spiral portion, or with a combination of a straight segment and a corrugated portion or a spiral portion. Stress concentration during bending may be reduced, enhancing the cable's adaptability and durability. In liquid-cooled cables for new energy devices, the power conducting member and outlet pipe may work in coordination. Through structures and materials described herein, efficient heat transfer and dissipation may be achieved, thereby improving the cable's overall performance, and extending its service life.

Various aspects are described in this disclosure, which include, but are not limited to, the following aspects:

1. A cable (e.g., 100) comprising: a plurality of power conducting members (e.g., 20) each extending between a first end (e.g., 101) of the cable (e.g., 100) and a second end (e.g., 103) thereof opposite to the first end (e.g., 101); and a plurality of pipes (e.g., 10) each enclosing a corresponding power conducting member of the power conducting members (e.g., 20), wherein a coolant passage for circulation of a coolant is disposed between an outer peripheral surface of the power conducting member (e.g., 20) and an inner peripheral surface of the pipe (e.g., 10), wherein each of the plurality of pipes (e.g., 10) comprises an offset segment, and a distance (e.g., d) in a radial direction of the pipe (e.g., 10) between an inner peripheral surface of the offset segment and a central axis (e.g., A-A) of the corresponding power conducting member (e.g., 20) varies along a longitudinal direction of the pipe (e.g., 10), as observed in a longitudinal cross-sectional view of the pipe (e.g., 10).
2. The cable of aspect 1, wherein the offset segment comprises at least one of a spiral portion (e.g., 14) or a corrugated portion (e.g., 13).
3. The cable of aspect 2, wherein the corrugated portion (e.g., 13) comprises a plurality of convex portions (e.g., 130) arranged to be spaced apart from each other, and each of the convex portions (e.g., 130) extends in a circumferential direction of the pipe (e.g., 10).
4. The cable of aspect 3, wherein each of the convex portions (e.g., 130) has a V-shaped, U-shaped, or trapezoidal cross-section, in a longitudinal cross-sectional view of the pipe (e.g., 10).
5. The cable of aspect 2, wherein the spiral portion (e.g., 14) comprises a convex portion (e.g., 140) extending in a spiral configuration around the central axis of the pipe (e.g., 10)
6. The cable of aspect 2, wherein the offset segment comprises a plurality of corrugated portions (e.g., 13) and/or a plurality of spiral portions (e.g., 14).
7. The cable of any of aspects 1 to 6, wherein the offset segment has a length ranging from 1% to 100% of a length of the pipe.
8. The cable of any of aspects 1 to 6, wherein the offset segment (e.g., 10C) has a bending radius that is in a range of four times to ten times an outer diameter of the pipe (e.g., 10), and the cable (e.g., 100) has a bending radius that is in a range of four times to ten times an outer diameter of the cable (e.g., 100).
9. The cable of any of aspects 1 to 6, wherein the pipe (e.g., 10) is configured as an outlet pipe; and the cable (e.g., 100) further comprises a plurality of inlet pipes (e.g., 30) extending substantially parallel to and in fluid communication with the outlet pipes (e.g., 10), and the coolant flows into the inlet pipes (e.g., 30) and exits via the outlet pipes (e.g., 10).
10. The cable of aspect 9, wherein the plurality of power conducting members (e.g., 20) comprises a first power conducting member (e.g., 20A) and a second power conducting member (e.g., 20B); the inlet pipe (e.g., 30) comprises a first inlet pipe (e.g., 31) and a second inlet pipe (e.g., 32); the outlet pipe (e.g., 10) comprises a first outlet pipe (e.g., 11) extending substantially parallel to and in fluid communication with the first inlet pipe (e.g., 31), and a second outlet pipe (e.g., 12) extending substantially parallel to and in fluid communication with the second inlet pipe (e.g., 32); and the first power conducting member (e.g., 20A) is disposed in the first outlet pipe (e.g., 11) and the second power conducting member (e.g., 20B) is disposed in the second outlet pipe (e.g., 12).

11. The cable of aspect 9, wherein the plurality of power conducting members (e.g., 20) comprise two first power conducting members (e.g., 20A) and two second power conducting members (e.g., 20B); the inlet pipe (e.g., 30) comprises a first inlet pipe (e.g., 31) and a second inlet pipe (e.g., 32); the outlet pipe (e.g., 10) comprises two first outlet pipes (e.g., 11) extending substantially parallel to and in fluid communication with the first inlet pipe (e.g., 31); and two second outlet pipes (e.g., 12) extending substantially parallel to and in fluid communication with the second inlet pipe (e.g., 32); and the two first power conducting members (e.g., 20A) are disposed in the two first outlet pipes (e.g., 11) respectively, and the two second power conducting members (e.g., 20B) are disposed in the two second outlet pipes (e.g., 12) respectively.

12. The cable of any of aspects 1 to 6, wherein the power conducting member (e.g., 20) of the cable operates at a temperature in a range of 50° C. to 85° C. under the application of a DC current of 500 A to 800 A.

13. The cable of any of aspects 1 to 6, wherein a nominal cross-sectional area of a core of each of the plurality of power conducting members (e.g., 20) is in a range of 16 $mm^2$ to 240 $mm^2$.

14. The cable of any of aspects 1 to 6, wherein the cable further comprises a grounding member (e.g., 60) having a core with a nominal cross-sectional area in a range of 2 $mm^2$ to 100 $mm^2$.

15. The cable of any of aspects 1 to 6, wherein the cable further comprises a plurality of signal conducting members (e.g., 50), each of which has a core with a nominal cross-sectional area in a range of 0.2 $mm^2$ to 2.5 $mm^2$.

16. The cable of any of aspects 1 to 6, wherein the pipe is made of fluoroplastic.

17. A charging system (e.g., 1) for electric vehicles, comprising: a charging gun (e.g., 200); and a cable (e.g., 100) connecting the charging gun (e.g., 200) to a cooling unit (e.g., 300), wherein a first end (e.g., 101) of the cable (e.g., 100) is connected to the charging gun (e.g., 200), and a second end (e.g., 103) of the cable (e.g., 100) opposite to the first end is connected to the cooling unit (e.g., 300), wherein the cable (e.g., 100) comprises a plurality of pipes (e.g., 10) configured for flow of a coolant, each of the plurality of pipes comprises an offset segment, the offset segment comprises, in a longitudinal cross-section view of the pipe (e.g., 10), a plurality of protruding portions protruding in a radial direction of the pipe (e.g., 10), a space (e.g., S) is disposed between the adjacent protruding portions, the plurality of protruding portions are configured such that when the cable (e.g., 100) is bent, the space (e.g., S) varies under an action of a bending force to accommodate a relative movement between the adjacent protruding portions.

18. The charging system for electric vehicles of aspect 17, wherein the plurality of protruding portions comprise a plurality of convex portions (e.g., 130) that are spaced apart from each other in a longitudinal direction of the pipe (e.g., 10), and each of the convex portions (e.g., 130) extends along a circumferential direction of the pipe (e.g., 10).

19. The charging system for electric vehicles of aspect 18, wherein each of the convex portions (e.g., 130) has a V-shaped, U-shaped, or trapezoidal cross-section, in a longitudinal cross-sectional view of the pipe (e.g., 10).

20. The charging system for electric vehicles of aspect 18, wherein the plurality of protruding portions further comprise successive convex portions (e.g., 140) extending in a spiral configuration around a central axis of the pipe (e.g., 10).

21. The charging system for electric vehicles of any of aspects 17 to 20, wherein the pipe is configured as an outlet pipe (e.g., 10); and the cable (e.g., 100) further comprises: a plurality of inlet pipes (e.g., 30) extending substantially parallel to and in fluid communication with the outlet pipes (e.g., 10), and the coolant flows into the inlet pipes (e.g., 30) and exits via the outlet pipes (e.g., 10).

22. The charging system for electric vehicles of aspect 21, wherein the charging gun (e.g., 200) comprises a first connecting member (e.g., 230) configured to fluidly connect the inlet pipe (e.g., 30) to the outlet pipe (e.g., 10); and a coolant from the cooling unit (e.g., 300) flows into the inlet pipe (e.g., 30) and enters the outlet pipe (e.g., 10) via the first connecting member (e.g., 230), and then flows back to the cooling unit (e.g., 300) from the outlet pipe (e.g., 10).

23. The charging system for electric vehicles of aspect 22, wherein the charging system (e.g., 1) further comprises a second connecting member (e.g., 210) provided at a second end (e.g., 103) of the cable, the second connecting member (e.g., 210) is configured in such a way that the outlet pipe (e.g., 10) and the inlet pipe (e.g., 30) are respectively in fluid communication with the cooling unit (e.g., 300).

24. The charging system for electric vehicles of aspect 21, wherein the outlet pipe (e.g., 10) comprises a first straight segment (e.g., 10A) adjacent to the first end (e.g., 101), a second straight segment (e.g., 10B) adjacent to the second end (e.g., 103), and the offset segment (e.g., 10C) provided between the first straight segment (e.g., 10A) and the second straight segment (e.g., 10B), and a distance between a center point of the offset segment (e.g., 10C) in a longitudinal direction and the charging gun (e.g., 200) is in a range of 1 meter to 15 meters.

25. A liquid-cooled cable comprising: a plurality of power conducting members (e.g., 20), each of the plurality of power conducting members extending between a first end (e.g., 101) and a second end (e.g., 103); and a plurality of pipes (e.g., 10), each of the plurality of pipes enclosing a respective power conducting member of the plurality of power conducting members and configured for coolant to flow from the first end to the second end of the respective power conducting member, each of the plurality of pipes comprising an offset segment (e.g., 10C) having portions spaced from the respective power conducting member by varying distances (e.g., d).

26. The liquid-cooled cable of aspect 25, wherein, for each of the plurality of pipes: the offset segment comprises a plurality of convex portions (e.g., 130, 140), and a plurality of spaces (e.g., S) between adjacent convex portions of the plurality of convex portions; and each of the plurality of convex portions extends in a circumferential direction of the pipe.

27. The liquid-cooled cable of aspect 26, wherein each of the plurality of convex portions has a V-shaped, U-shaped, or trapezoidal cross-section.

28. The liquid-cooled cable of aspect 25, wherein the offset segment is spiral-shaped or corrugated.

29. The liquid-cooled cable of aspect 28, wherein the offset segment comprises a plurality of corrugated portions (e.g., 13) and/or a plurality of spiral portions (e.g., 14).

30. The liquid-cooled cable of aspect 25, wherein, for each of the plurality of pipes, the offset segment has a length ranging from 1% to 100% of a length of the pipe.

31. The liquid-cooled cable of aspect 25, wherein, for each of the plurality of pipes, the offset segment has a bending radius (e.g., R) in a range of four times to ten times an outer diameter of the pipe.

32. The liquid-cooled cable of aspect 25, wherein the plurality of pipes are a plurality of first pipes; and the cable comprises a plurality of second pipes (e.g., 30) fluidly connected to respective first pipes of the plurality of first pipes.

33. The liquid-cooled cable of aspect 32, wherein the plurality of power conducting members comprise a positive power conducting member (e.g., 20A) and a negative power conducting member (e.g., 20B) each disposed in a respective first pipe of the plurality of first pipes; and none of the plurality of power conducting members are disposed in any of the plurality of second pipes.

34. The liquid-cooled cable of aspect 33, wherein the plurality of first pipes are a plurality of outlet pipes; and the plurality of second pipes are a plurality of inlet pipes.

35. The liquid-cooled cable of aspect 25, wherein each of the plurality of power conducting members has a nominal cross-sectional area in a range of 16 $mm^2$ to 240 $mm^2$; and the cable comprises a grounding member (e.g., 60) having a nominal cross-sectional area in a range of 2 $mm^2$ to 100 $mm^2$, and a plurality of signal conducting members each having a nominal cross-sectional area in a range of 0.2 $mm^2$ to 2.5 $mm^2$.

36. The liquid-cooled cable of aspect 35, wherein each of the plurality of power conducting members extends longitudinally over a length in a range of 1 meter to 15 meters; and the plurality of power conducting members have an operating temperature in a range of 50° C. to 85° C. under an application of a direct current in a range of 500 A to 800 A.

37. A charging system, comprising a charging gun (e.g., 200) comprising a plurality of connecting members (e.g., 230); and a liquid-cooled cable comprising: a plurality of inlet pipes (e.g., 30), each of the plurality of inlet pipes connected to a respective connecting member of the plurality of connecting members, a plurality of outlet pipes (e.g., 10), each of the plurality of outlet pipes connected to a respective inlet pipe of the plurality of inlet pipes through the respective connecting member such that there is a coolant flow path into the respective inlet pipe through the respective connecting member and into the outlet pipe, and a plurality of power conducting members (e.g., 20), each of the plurality of power conducting members disposed in a respective outlet pipe of the plurality of outlet pipes.

38. The charging system of aspect 37, wherein each of the plurality of outlet pipes comprises an offset segment (e.g., 10C), the offset segment comprising a plurality of protruding portions (e.g., 130, 140) and a plurality of spaces (e.g., S) disposed between adjacent protruding portions of the plurality of protruding portions, such that the plurality of protruding portions are configured to move closer to adjacent protruding portions when the outlet pipe is in a flexed state.

39. The charging system of aspect 38, wherein the cable comprises a first end (e.g., 101) connected to the charging gun, and a second end (e.g., 103) configured for connection with a cooling unit.

40. The charging system of aspect 139, wherein each of the plurality of outlet pipes comprises a first straight segment (e.g., 10A) at the first end, a second straight segment (e.g., 10B) at the second end, and the offset segment between the first straight segment and the second straight segment; and a distance between a center point of the offset segment in a longitudinal direction and the charging gun is in a range of 1 meter to 15 meters.

41. The charging system of aspect 37, wherein each of the plurality of power conducting members has a nominal cross-sectional area in a range of 16 $mm^2$ to 240 $mm^2$; and the cable comprises a grounding member (e.g., 60) having a nominal cross-sectional area in a range of 2 $mm^2$ to 100 $mm^2$, and a plurality of signal conducting members each having a nominal cross-sectional area in a range of 0.2 $mm^2$ to 2.5 $mm^2$.

42. The charging system of aspect 41, wherein each of the plurality of power conducting members extends longitudinally over a length in a range of 1 meter to 15 meters; and the plurality of power conducting members have an operating temperature in a range of 50° C. to 85° C. under an application of a rated direct current in a range of 500 A to 800 A.

43. A method of cooling a cable, the cable extending between a first end (e.g., 101) and a second end (e.g., 103), and comprising a plurality of power conducting members (e.g., 20), a plurality of first pipes each (e.g., 10) enclosing a respective power conducting member of the plurality of power conducting members, and a plurality of second pipes (e.g., 30), the method comprising flowing coolant into the plurality of second pipes from the second end of the cable to the first end of the cable; directing the coolant to enter the plurality of first pipes from respective second pipes of the plurality of second pipes from the first end of the cable and to surround the plurality of power conducting members; and flowing the coolant out of the plurality of first pipes from the second end of the cable.

44. The method of aspect 43, wherein the first end of the cable is connected to a plurality of connecting members (e.g., 230); and directing the coolant to enter the plurality of first pipes comprises flowing the coolant through the plurality of connecting members.

45. The method of aspect 43, wherein the first end of the cable is configured to be connected to a load; and the second end of the cable is configured to be connected to a power source.

46. A charging system comprising: a liquid-cooled cable comprising a plurality of power conducting members (e.g., 20), each of the plurality of power conducting members extending between a first end (e.g., 101) and a second end (e.g., 103), and a plurality of pipes (e.g., 10), each of the plurality of pipes enclosing a respective power conducting member of the plurality of power conducting members and configured for coolant to flow from the first end to the second end of the respective power conducting member; a plurality of connecting members (e.g., 210), each of the plurality of connecting members comprising a first opening (e.g., 182), a second opening (e.g., 184), and a third opening (e.g., 186), and connected to a respective pipe of the plurality of pipes at the second opening; and a plurality of terminals (e.g., 112) attached to respective ends of the first and second ends of respective power conducting members of the plurality of power conducting members, each of the plurality of terminals comprising a first portion disposed in a respective connecting member of the plurality of connecting members and a second portion extending out of the first opening of the respective connecting member.

47. The charging system of aspect 46, wherein the plurality of pipes are a plurality of first pipes (e.g., 10); and the charging system comprises a plurality of second pipes (e.g., 30) connected to the second openings of respective connecting members of the plurality of connecting members.

48. The charging system of aspect 47, wherein the plurality of terminals are configured to be connected to a load; the plurality of first pipes are outlet pipes to the plurality of connecting members (e.g., 230); and the plurality of second pipes are inlet pipes to the plurality of connecting members.

49. The charging system of aspect 47, wherein the plurality of terminals are configured to be connected to a power source; the plurality of first pipes are inlet pipes to the plurality of connecting members (e.g., 210); and the plurality of second pipes are outlet pipes to the plurality of connecting members.

50. The charging system of any of aspects 46-49, wherein, for each of the plurality of terminals, the second portion comprises an opening (e.g., 126).

51. The charging system of any of aspects 46-50, wherein each of the plurality of connecting members comprises plastic and/or metal.

52. The charging system of any of aspects 46-51, wherein each of the plurality of connecting members comprises a rotatable portion (e.g., 168) having the third opening.

Having thus described several aspects of several embodiments, it is to be appreciated that various alterations, modifications, and improvements will readily occur to those skilled in the art. Such alterations, modifications, and improvements are intended to be part of this disclosure and are intended to be within the spirit and scope of the invention. While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

Further, though some advantages of the present invention may be indicated, it should be appreciated that not every embodiment of the invention will include every described advantage. Some embodiments may not implement any features described as advantageous. Accordingly, the foregoing description and drawings are by way of example only.

Also, the technology described may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used, should be understood to control over dictionary definitions, definitions in documents incorporated by reference, and/or ordinary meanings of the defined terms.

It should be noted that the terms used herein are for describing specific embodiments, and are not intended to limit the exemplary embodiments according to the present disclosure. As used herein, an expression of a singular form includes an expression of a plural form unless otherwise indicated. In addition, it should also be understood that when the terms "including" and/or "comprising" are used herein, it indicates the presence of features, steps, operations, parts, components, and/or combinations thereof.

The indefinite articles "a" and "an," as used in the specification and in the claims, unless clearly indicated to the contrary, should be understood to mean "at least one."

The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally Including other elements); etc.

In the claims, as well as in the specification above, all transitional phrases such as “comprising,” “including,” “carrying,” “having,” “containing,” “involving,” “holding,” “composed of,” and the like are to be understood to be open-ended, i.e., to mean including but not limited to. For example, a process, method, system, product, or device that contains a series of steps or units need not be limited to those steps or units that are clearly listed, instead, it may include other steps or units that are not clearly listed or are inherent to these processes, methods, products, or devices. Only the transitional phrases “consisting of” and “consisting essentially of” shall be closed or semi-closed transitional phrases, respectively.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

In the claims, as well as in the specification above, use of ordinal terms such as “first,” “second,” “third,” etc. does not by itself connote any priority, precedence, or order of one element over another or the temporal order in which acts of a method are performed, but are used merely as labels to distinguish one element having a certain name from another element having a same name (but for use of the ordinal term) to distinguish the elements.

What is claimed is:

1. A liquid-cooled cable comprising:

a plurality of power conducting members, each of the plurality of power conducting members extending between a first end and a second end; and a plurality of pipes, each of the plurality of pipes enclosing a respective power conducting member of the plurality of power conducting members and configured for coolant to flow from the first end to the second end of the respective power conducting member, each of the plurality of pipes comprising an offset segment having portions spaced from the respective power conducting member by varying distances.

2. The liquid-cooled cable of claim 1, wherein, for each of the plurality of pipes:

the offset segment comprises a plurality of convex portions, and a plurality of spaces between adjacent convex portions of the plurality of convex portions; and each of the plurality of convex portions extends in a circumferential direction of the pipe.

3. The liquid-cooled cable of claim 2, wherein:

each of the plurality of convex portions has a V-shaped, U-shaped, or trapezoidal cross-section.

4. The liquid-cooled cable of claim 1, wherein:

the offset segment is spiral-shaped or corrugated.

5. The liquid-cooled cable of claim 4, wherein:

the offset segment comprises a plurality of corrugated portions and/or a plurality of spiral portions.

6. The liquid-cooled cable of claim 1, wherein, for each of the plurality of pipes:

the offset segment has a bending radius in a range of four times to ten times an outer diameter of the pipe.

7. The liquid-cooled cable of claim 1, wherein:

the plurality of pipes are a plurality of first pipes; and the liquid-cooled cable comprises a plurality of second pipes fluidly connected to respective first pipes of the plurality of first pipes.

8. The liquid-cooled cable of claim 7, wherein:

the plurality of power conducting members comprise a positive power conducting member and a negative power conducting member each disposed in a respective first pipe of the plurality of first pipes; and none of the plurality of power conducting members are disposed in any of the plurality of second pipes.

9. The liquid-cooled cable of claim 8, wherein:

the plurality of first pipes are a plurality of outlet pipes; and the plurality of second pipes are a plurality of inlet pipes.

10. The liquid-cooled cable of claim 1, wherein:

each of the plurality of power conducting members has a nominal cross-sectional area in a range of 16 $mm^2$ to 240 $mm^2$; and the liquid-cooled cable comprises a grounding member having a nominal cross-sectional area in a range of 2 $mm^2$ to 100 $mm^2$, and a plurality of signal conducting members each having a nominal cross-sectional area in a range of 0.2 $mm^2$ to 2.5 $mm^2$.

11. The liquid-cooled cable of claim 10, wherein:

each of the plurality of power conducting members extends longitudinally over a length in a range of 1 meter to 15 meters.

12. A charging system, comprising:

a charging gun comprising a plurality of connecting members; and the liquid-cooled cable of claim 1, wherein the plurality of pipes are a plurality of outlet pipes, the liquid-cooled cable comprising:

a plurality of inlet pipes, each of the plurality of inlet pipes connected to a respective connecting member of the plurality of connecting members, the plurality of outlet pipes, each of the plurality of outlet pipes connected to a respective inlet pipe of the plurality of inlet pipes through the respective connecting member such that there is a coolant flow path into the respective inlet pipe through the respective connecting member and into the outlet pipe, and the plurality of power conducting members, each of the plurality of power conducting members disposed in a respective outlet pipe of the plurality of outlet pipes.

13. The charging system of claim 12, wherein:

the offset segment comprises a plurality of protruding portions and a plurality of spaces disposed between adjacent protruding portions of the plurality of protruding portions, such that the plurality of protruding portions are configured to move closer to adjacent protruding portions when the outlet pipe is in a flexed state.

14. The charging system of claim 13, wherein:

the liquid-cooled cable comprises a first end connected to the charging gun, and a second end configured for connection with a cooling unit.

15. The charging system of claim 14, wherein:

each of the plurality of outlet pipes comprises a first straight segment at the first end, a second straight segment at the second end, and the offset segment between the first straight segment and the second straight segment; and a distance between a center point of the offset segment in a longitudinal direction and the charging gun is in a range of 1 meter to 15 meters.

16. The charging system of claim 12, wherein:

each of the plurality of power conducting members has a nominal cross-sectional area in a range of 16 $mm^2$ to 240 $mm^2$; and the liquid-cooled cable comprises a grounding member having a nominal cross-sectional area in a range of 2 $mm^2$ to 100 $mm^2$, and a plurality of signal conducting members each having a nominal cross-sectional area in a range of 0.2 $mm^2$ to 2.5 $mm^2$.

17. The charging system of claim 16, wherein:

each of the plurality of power conducting members extends longitudinally over a length in a range of 1 meter to 15 meters.

18. A method of cooling the liquid-cooled cable of claim 1, wherein the plurality of pipes are a plurality of first pipes, the liquid-cooled cable extending between a first end and a second end, and comprising a plurality of second pipes, the method comprising:

flowing coolant into the plurality of second pipes from the second end of the liquid-cooled cable to the first end of the liquid-cooled cable;

directing the coolant to enter the plurality of first pipes from respective second pipes of the plurality of second pipes from the first end of the liquid-cooled cable and to surround the plurality of power conducting members; and flowing the coolant out of the plurality of first pipes from the second end of the liquid-cooled cable.

19. The method of claim 18, wherein:

the first end of the liquid-cooled cable is connected to a plurality of connecting members; and directing the coolant to enter the plurality of first pipes comprises flowing the coolant through the plurality of connecting members.

20. The method of claim 18, wherein:

the first end of the liquid-cooled cable is configured to be connected to a load; and the second end of the liquid-cooled cable is configured to be connected to a power source.

* * * * *